US010764596B2

(12) United States Patent
Pandit et al.

(10) Patent No.: US 10,764,596 B2
(45) Date of Patent: *Sep. 1, 2020

(54) TILING IN VIDEO ENCODING AND DECODING

(71) Applicant: DOLBY LABORATORIES LICENSING CORPORATION, San Francisco, CA (US)

(72) Inventors: Purvin Bibhas Pandit, Franklin Park, NJ (US); Peng Yin, Ithaca, NY (US); Dong Tian, Boxborough, MA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/551,156

(22) Filed: Aug. 26, 2019

(65) Prior Publication Data

US 2019/0379897 A1    Dec. 12, 2019

Related U.S. Application Data

(63) Continuation of application No. 16/393,371, filed on Apr. 24, 2019, now Pat. No. 10,432,958, which is a
(Continued)

(51) Int. Cl.
*H04N 19/00* (2014.01)
*H04N 19/46* (2014.01)
(Continued)

(52) U.S. Cl.
CPC ........... *H04N 19/46* (2014.11); *H04N 13/111* (2018.05); *H04N 13/161* (2018.05);
(Continued)

(58) Field of Classification Search
CPC ..... H04N 19/46; H04N 19/172; H04N 19/597
(Continued)

(56) References Cited

U.S. PATENT DOCUMENTS

| | | |
|---|---|---|
| 5,193,000 A | 3/1993 | Lipton |
| 5,915,091 A | 6/1999 | Ludwig |

(Continued)

FOREIGN PATENT DOCUMENTS

| | | |
|---|---|---|
| DE | 19619598 | 11/1997 |
| EP | 1501318 | 1/2005 |

(Continued)

OTHER PUBLICATIONS

US 7,539,250 B2, 05/2009, Routhier (withdrawn)
(Continued)

*Primary Examiner* — Jeffery A Williams

(57) ABSTRACT

Implementations are provided that relate, for example, to view tiling in video encoding and decoding. A particular method includes accessing a video picture that includes multiple pictures combined into a single picture (826), accessing information indicating how the multiple pictures in the accessed video picture are combined (806, 808, 822), decoding the video picture to provide a decoded representation of at least one of the multiple pictures (824, 826), and providing the accessed information and the decoded video picture as output (824, 826). Some other implementations format or process the information that indicates how multiple pictures included in a single video picture are combined into the single video picture, and format or process an encoded representation of the combined multiple pictures.

10 Claims, 28 Drawing Sheets

Related U.S. Application Data continuation of application No. 16/144,971, filed on Sep. 27, 2018, now Pat. No. 10,298,948, which is a continuation of application No. 15/935,869, filed on Mar. 26, 2018, now Pat. No. 10,129,557, which is a continuation of application No. 15/879,280, filed on Jan. 24, 2018, now Pat. No. 9,986,254, which is a continuation of application No. 15/791,238, filed on Oct. 23, 2017, now Pat. No. 9,973,771, which is a continuation of application No. 15/600,338, filed on May 19, 2017, now Pat. No. 9,838,705, which is a continuation of application No. 15/244,192, filed on Aug. 23, 2016, now Pat. No. 9,706,217, which is a continuation of application No. 14/946,252, filed on Nov. 19, 2015, now Pat. No. 9,445,116, which is a continuation of application No. 14/817,597, filed on Aug. 4, 2015, now Pat. No. 9,232,235, which is a continuation of application No. 14/735,371, filed on Jun. 10, 2015, now Pat. No. 9,219,923, which is a continuation of application No. 14/300,597, filed on Jun. 10, 2014, now Pat. No. 9,185,384, which is a continuation of application No. 12/450,829, filed as application No. PCT/US2008/004747 on Apr. 11, 2008, now Pat. No. 8,780,998.

(60) Provisional application No. 60/925,400, filed on Apr. 20, 2007, provisional application No. 60/923,014, filed on Apr. 12, 2007.

(51) Int. Cl.
  *H04N 19/182* (2014.01)
  *H04N 19/172* (2014.01)
  *H04N 13/161* (2018.01)
  *H04N 13/194* (2018.01)
  *H04N 19/70* (2014.01)
  *H04N 19/61* (2014.01)
  *H04N 19/597* (2014.01)
  *H04N 13/111* (2018.01)

(52) U.S. Cl.
  CPC ......... *H04N 13/194* (2018.05); *H04N 19/172* (2014.11); *H04N 19/182* (2014.11); *H04N 19/597* (2014.11); *H04N 19/61* (2014.11); *H04N 19/70* (2014.11); *H04N 2213/003* (2013.01)

(58) Field of Classification Search
  USPC ..................................... 375/240.25
  See application file for complete search history.

(56) References Cited

U.S. PATENT DOCUMENTS

| | | | |
|---|---|---|---|
| 6,055,012 A | 4/2000 | Haskell | |
| 6,157,396 A | 12/2000 | Margulis | |
| 6,173,087 B1 | 1/2001 | Kumar | |
| 6,223,183 B1 | 4/2001 | Smith | |
| 6,390,980 B1 | 5/2002 | Peterson | |
| 7,254,264 B2 | 8/2007 | Naske | |
| 7,254,265 B2 | 8/2007 | Naske | |
| 7,321,374 B2 | 1/2008 | Naske | |
| 7,391,811 B2 | 6/2008 | Itoi | |
| 7,489,342 B2 | 2/2009 | Xin | |
| 7,552,227 B2 | 6/2009 | Wang | |
| 8,139,142 B2 | 3/2012 | Bamji | |
| 8,259,162 B2 | 9/2012 | Kim | |
| 8,885,721 B2 | 11/2014 | Tourapis | |
| 2003/0048354 A1 | 3/2003 | Takemoto | |
| 2003/0107643 A1* | 6/2003 | Yoon .................... | G03B 35/20 348/47 |
| 2003/0198290 A1 | 10/2003 | Millin | |
| 2004/0012684 A1* | 1/2004 | Tinnerino ............ | H04N 5/3415 348/208.1 |
| 2004/0028288 A1 | 2/2004 | Edgar | |
| 2005/0117637 A1 | 6/2005 | Routhier | |
| 2005/0134731 A1 | 6/2005 | Lee | |
| 2005/0243920 A1 | 11/2005 | Murakami | |
| 2006/0176318 A1 | 8/2006 | Martin | |
| 2006/0222254 A1 | 10/2006 | Zandi | |
| 2006/0262856 A1 | 11/2006 | Wu | |
| 2007/0030356 A1 | 2/2007 | Yeah | |
| 2007/0041633 A1 | 2/2007 | Bhaskaran | |
| 2007/0121722 A1 | 5/2007 | Martinian | |
| 2007/0153838 A1 | 7/2007 | Pons | |
| 2007/0177813 A1 | 8/2007 | Yang | |
| 2007/0205367 A1 | 9/2007 | Deman | |
| 2007/0211796 A1 | 9/2007 | Kim | |
| 2007/0229653 A1 | 10/2007 | Matusik | |
| 2007/0269136 A1 | 11/2007 | Naske | |
| 2008/0199091 A1* | 8/2008 | Srinivasan ........... | H04N 19/176 382/239 |
| 2008/0284763 A1 | 11/2008 | Someya | |
| 2008/0303895 A1 | 12/2008 | Akka | |
| 2009/0002481 A1 | 1/2009 | Kim | |
| 2009/0092311 A1 | 4/2009 | Kim | |
| 2009/0219282 A1 | 9/2009 | Kim | |
| 2010/0026712 A1 | 2/2010 | Aliprandi | |
| 2010/0238267 A1* | 9/2010 | Izzat .................... | H04N 13/183 348/43 |

FOREIGN PATENT DOCUMENTS

| | | | |
|---|---|---|---|
| EP | 1581003 | 9/2005 | |
| EP | 1667448 | 6/2006 | |
| EP | 1729521 | 12/2006 | |
| EP | 2096870 | 9/2009 | |
| EP | 2197217 | 6/2010 | |
| JP | 08070475 | 3/1996 | |
| JP | 2000308089 | 11/2000 | |
| JP | 2004048293 | 2/2004 | |
| JP | 2004120169 | 4/2004 | |
| JP | 2004240469 | 8/2004 | |
| JP | 2005110113 | 4/2005 | |
| JP | 2005124200 | 5/2005 | |
| JP | 2006191357 | 7/2006 | |
| JP | 2006310955 | 11/2006 | |
| JP | 2007036368 | 2/2007 | |
| JP | 2007159111 | 6/2007 | |
| JP | 2008034892 | 2/2008 | |
| JP | 2009182953 | 8/2009 | |
| KR | 20050055163 | 6/2005 | |
| KR | 100535147 | 12/2005 | |
| KR | 20090102116 | 9/2009 | |
| RU | 2006101400 | 12/2001 | |
| RU | 2189120 | 9/2002 | |
| RU | 2007103160 | 8/2008 | |
| WO | 9743863 | 11/1997 | |
| WO | 9802844 | 1/1998 | |
| WO | 0193596 | 12/2001 | |
| WO | 0225420 | 3/2002 | |
| WO | 03092305 | 11/2003 | |
| WO | 2005112448 | 11/2005 | |
| WO | 2006001653 | 1/2006 | |
| WO | 2006006127 | 1/2006 | |
| WO | 2006041261 | 4/2006 | |
| WO | WO-2006072985 A1 * | 7/2006 | ......... H04N 21/4316 |
| WO | 2006137006 | 12/2006 | |
| WO | 2007046957 | 4/2007 | |
| WO | 2007047736 | 4/2007 | |
| WO | 2007081926 | 7/2007 | |
| WO | 2007126508 | 11/2007 | |
| WO | 2008024345 | 2/2008 | |
| WO | 2008127676 | 10/2008 | |
| WO | 2008140190 | 11/2008 | |
| WO | 2008150111 | 12/2008 | |
| WO | 2008156318 | 12/2008 | |

(56) References Cited

FOREIGN PATENT DOCUMENTS

| WO | 2009040701 | 4/2009 |
|---|---|---|
| WO | 2010011557 | 1/2010 |

OTHER PUBLICATIONS

Murakami Tomokazu, "Adaptive Picture Flipping Coding", Jul. 26-Aug. 5, 2005, Hitachi, Ltd., Working Party, Yokohama, Japan.
Bruls et al., "Proposal to Amendment MPEG-C Part 3", International Organisation for Standardisation, ISO/IEc JTC1/SC29/WG11, Coding of Moving Pictures and Audio, Lausanne, Jul. 2007.
Costello, "Exit Orientation Tag (Feb. 17, 2002)", Internet article: http://web.archive.org/web/20022071400041 7/http://sylvana.net/jpegcrop/ex- if.sub.-orientation.html, 3 pages.
De Bruyne et al., "Enhanced Shot-Based Video Adaptation Using MPEG-21 Generic Bitstream Syntax Schema", Proceedings of the 2007 IEEE Symposium on Computational Intelligence in Image and Signal Processing (CIISP 2007), pp. 380-385.
De Neve et al., "Using Bitstream Structure Descriptions for the Exploitation of Multi-Layered Temporal Scalability in H.264/AVC's Base Specification", PCM 2005, Part 1, LNCS 3767, Springer-Verlag, Berlin, Heidelberg, 2005, pp. 641-652.
Dickson, "NAB 2010: Grass Valley Unveils New Ignite Automation Product", Broadcasting and Cable, Apr. 12, 2010, 1 page.
Drose et al., "Extending Single View Scalable Video Coding to Multi-view Based on H.264/AVC," IEEE International Conference on Image Processing, Oct. 8-11, 2006, Atlanta, Georgia.
Fehn et al., "An Evolutionary and Optimized Approach on 3D-TV", 2003, pp. 1-8.
Fehn et al., "Study of Some MPEG Tools Related to 3D-Video", Inernational organisation for Standardisation, Coding of Moving Pictures and Associated Audio Information, ISO/IEC JTC1/SC29/WG11, MPEG02/M8423, Fairfax, May 2002, 6 pages.
HDMI Licensing, LLC, FAQ for HDMI 1.4, Feb. 18, 2011, pp. 1-6.
HDMI Licensing, LLC., "3D Portion of the HDMI Specification Version 1.4", Press Release Jan. 26, 2011, 2 pages.
International Standard ISO/IEC 23002-3, "Information Technology—MPEG Video Technologies—Part 3: Representation of Auxiliary Video and Supplemental Information", First Edition Oct. 15, 2007, 34 pages.
International Telecommunication Union, Reply LS from ISO/IEC JTC 1/SC29/WG 11 on Video Coding Activities (COM16-LS-38), Study Group 16, Geneva, Oct. 26-Nov. 6, 2009, 2 pages.
Li et al., "A Novel Multi-View Video Coding Scheme Based on H.264," ICICS-PCM 2003, Dec. 15-18, 2003, pp. 493-497.
Library of Congress, "American Memory", http://memory.loc.gov/ammem/help/compression.html Oct. 24, 2007, 1 page.
Martinian et al., "Extensions of H.264/AVC for Multiview Video Compression", 2006 IEEE International Conference on Image Processing, Oct. 8, 2006, pp. 2981-2984.
Martinian et al., "View Synthesis for Multiview Video Compression", Mitsubishi Electric Research Laboratories, TR2006-035, May 2006, Picture Coding Symposium 2006, 8 pages.
Meesen et al., "Content Browsing and Semantic Context Viewing Through JPEG 2000-Based Scalable Video Summary," IEE Proceedings of Visual Image Signal Processing, vol. 153, No. 3, Jun. 2006, pp. 274-283.
Motorola, "3D Cinecast: A Curation About New Media Technologies," Overview of MPEG Standards for 3DTV, Apr. 21, 2010.
Motorola, "Overview of MPEG Standards for 3DTV", White Paper, four pages.
Murakami et al., "Adaptive Picture Flipping Coding on KTA Software", ITU Telecommunications Standardization Sector, Study Group 16 Question 6, 31st Mtg., Marrakech, MA, Jan. 15-16, 2007, Doc. VCEG-AE17, p. 1-4.
Pandit et al., "H.264/AVC Extension for MVC Using SEI Message", JVT of ISO/IEC MPEG & ITU-T VCEG, Document: JVT-X061, 24th Meeting: Geneva, Switzerland, Jun. 29-Jul. 6, 2007, pp. 1-14.
Pandit et al., "High Level Syntax changes for MVC", Joint Video Team (JVT) of ISO/IEC MPEG & ITU-T VCEG (ISO/IEC JTC1/SC29/WG11 and ITU-T SG16 Q.6), 22nd Mtg., Marrkech, Morocco, Jan. 13-19, 2006, Doc.: JVT-V054, p. 1-10.
Sullivan et al., "Coding of Moving Pictures and Audio Information", International Organisation for Standardisation, ISO/IEC JTC1/SC29/WG11N 10540, Maui, US, Apr. 2009.
Sullivan, et al. "Constrained Baseline profile and supplemental enhancement information" JVT of ISO/IEC MPEG & ITU-T VCEG, 29th Meeting, Busan, KR, Oct. 12-17, 2008.
Technical Standardization Committee on AV & IT Storage Systems and Equipment: Japan Electronics and Information Technologies Industries Assn: Exchangeable Image File Format for Digital Still Cameras: Exif Version 2.2, Apr. 2002, pp. 1-18.
Tian et al., "On 2D+Depth SEI Message", International Organisation for Standardisation, ISO/IEC JTC1/SC29/WG11, MPEG 2009/M16320, Maui, US, Apr. 2009.
Tian et al., "On Spatially Interleaved Pictures SEI Message", JVT of ISO/IEC MPEG & ITU-T VCEG, Document: JVT-AD017, Geneva, CH, Jan. 29-Feb. 3, 2009, pp. 1-11.
Tourapis et al., JVT of ISO/IEC MPEG & ITU-T VCEG, "Format Extensions to the Spatially Interleaved Pictures SEI Message", Document: JVT-AD022, Geneva, CH, Jan. 29-Feb. 3, 2009.
Venuti, "Introducing HDMI 1.4 Specification Features", High Definition Multimedia Interface, HDMI Licensing, LLC, 2009, pp. 1-33.
Vetro et al., "Joint Draft 2.0 on Multiview Video Coding," JVT of ISO/IEC MPEG & ITU-T VCEG. Document: JVT-V209, 22nd Meeting: Marrakech, Morocco, Jan. 13-19, 2007.
Vetro, "Frame Compatible Formats for 3D Video Distribution", Mitsubishi Electric Research Laboratories, TR2010-099, Cambridge, Massachusetts, Nov. 2010.
Wimmer, "Aufahme and Wiedergabe Stereokopischer Videos im Anwendungsbereich der Telkooperation," Linz, Austria, pp. 1-12, May 2004.
Wimmer, "DV/HDV Tape Drive Synchronization" Steroscopic Displays and Appllications Conference, Jan. 29-31, 2007, San Jose, CA, pp. 1-20.
Wimmer, "Stereoscopic Metadata Format Specification," Version 1.3, pp. 1-9, http:www.3dtv/atpffoce.COPYRGT.3dtv.at, Linz, Austria, Jul. 8, 2006.
Wimmer, "Stereoscopic Movie Disk, 3DTV" Two Posters, Johannes Kepler University, Linz, Austria, Nov. 27-28, 2006.
Wimmer, "Stereoscopic Player and Stereomultiplexer," a Computer-Based System for Stereoscopic Video Playback and Recording, Johannes Kepler University, Linz, Austria, pp. 1-9, Nov. 27-28, 2006.
Yamakage et al., "Generalized SEI Message for Spatially Interleaved Pictures", JVT of ISO/IEc MPEG & ITU-T VCEG, Document: JVT-AD012, Geneva, CH, Jan. 29-Feb. 3, 2009, pp. 1-6.
Yan et al., "Region-Based Compression of Remote Sensing Stereo Image Pairs", Proceedings of SPIE, vol. 7455, 2009, pp. 1-13.

* cited by examiner

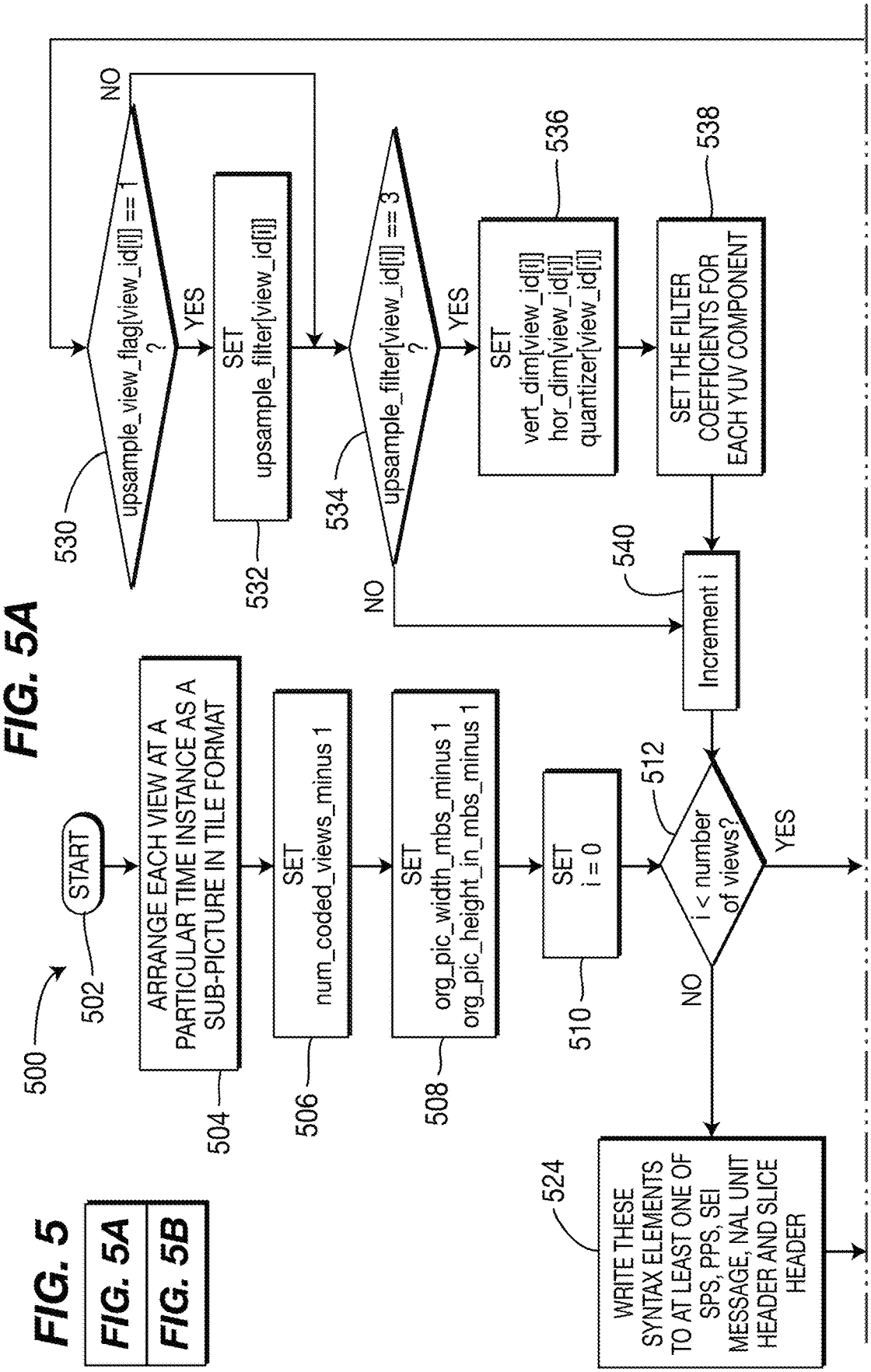

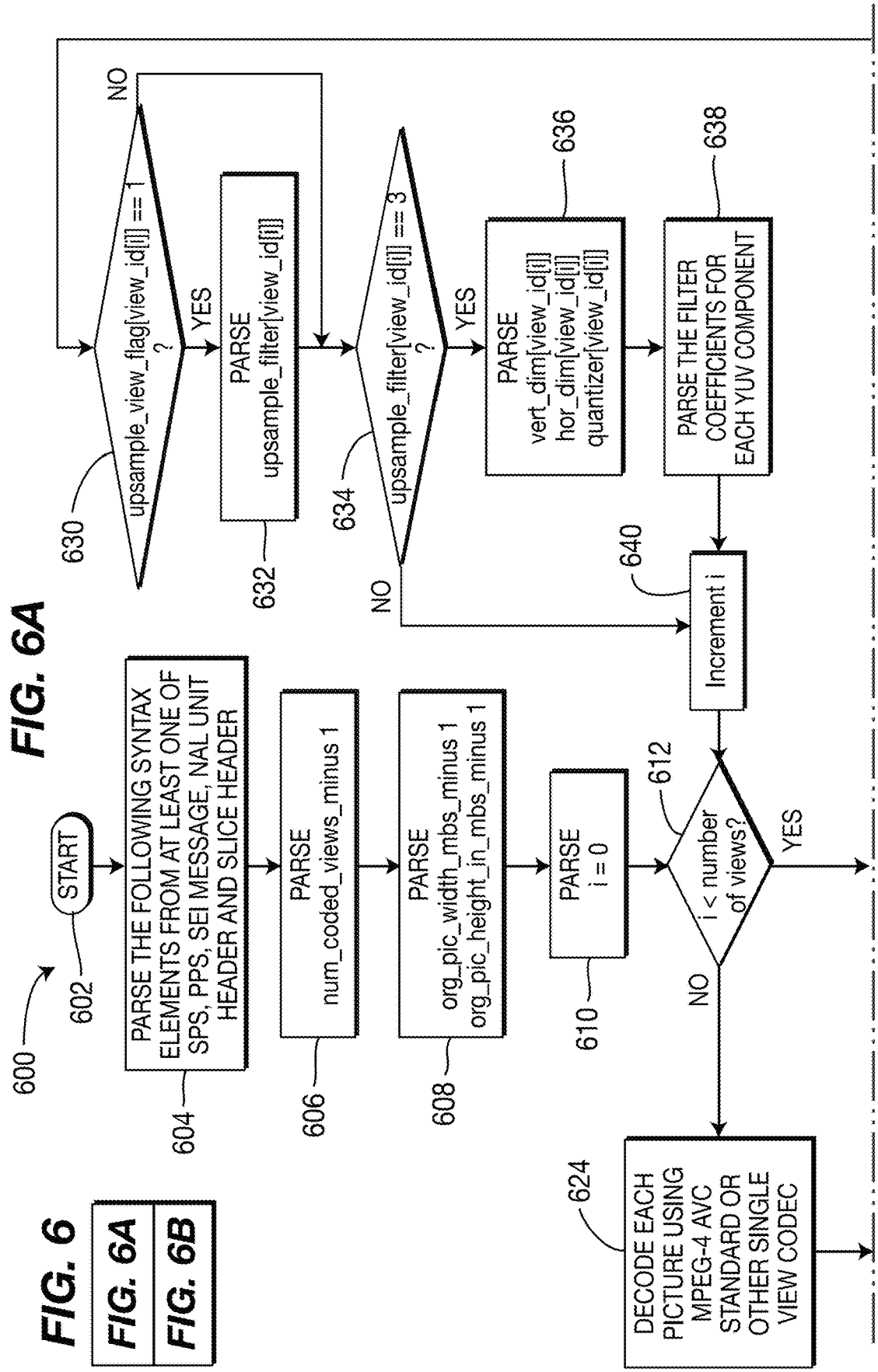

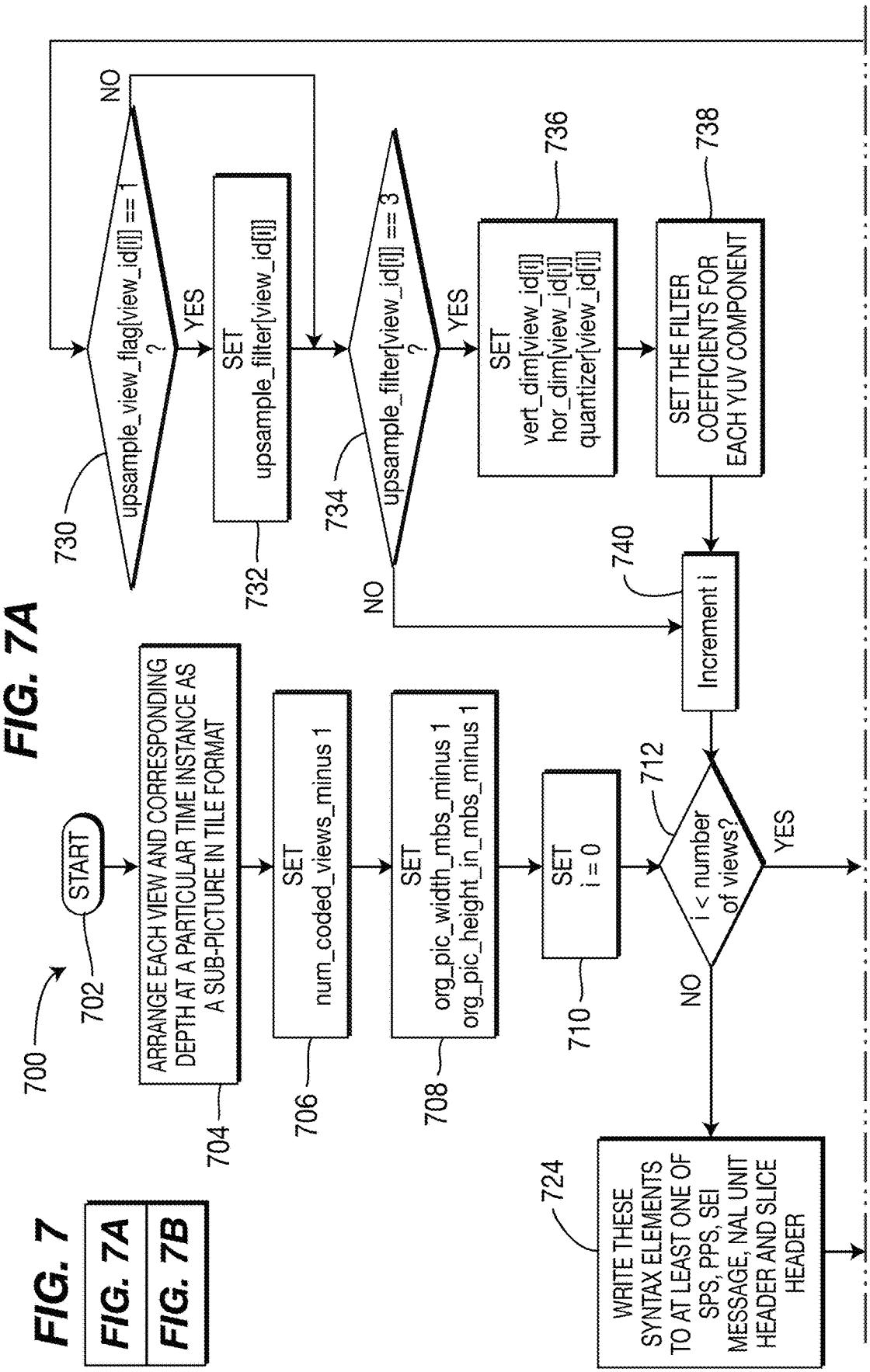

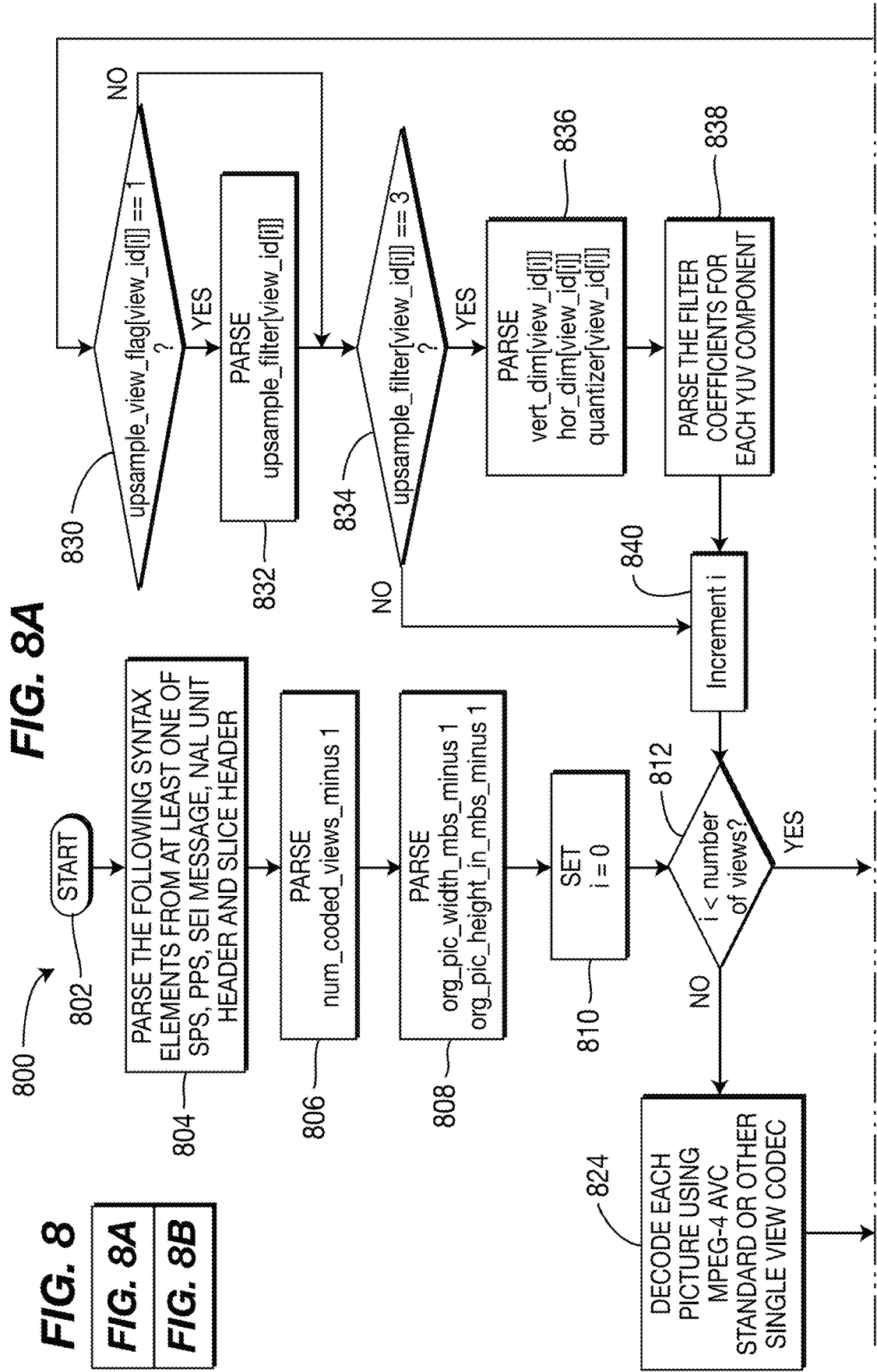

900

1000

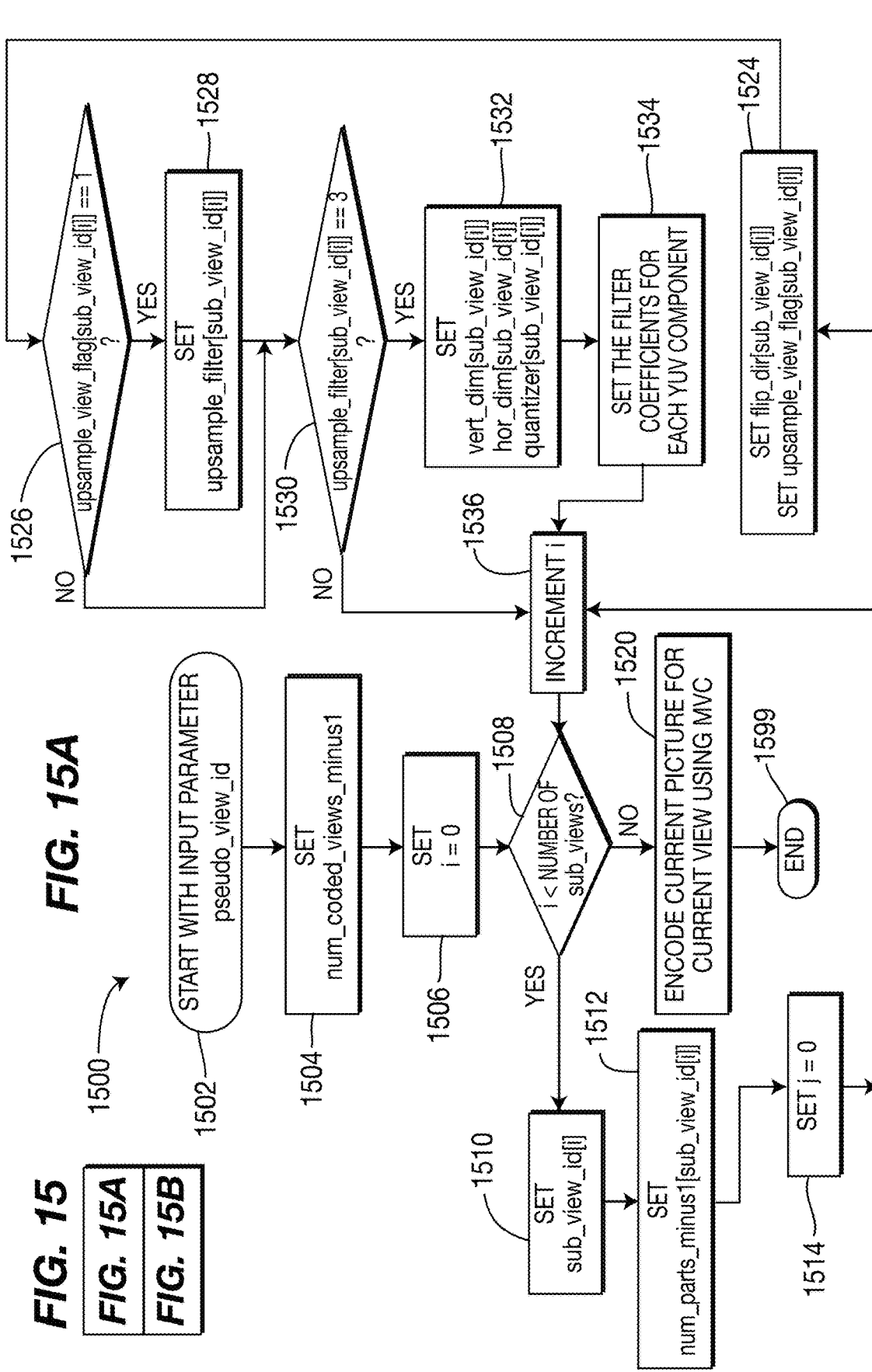

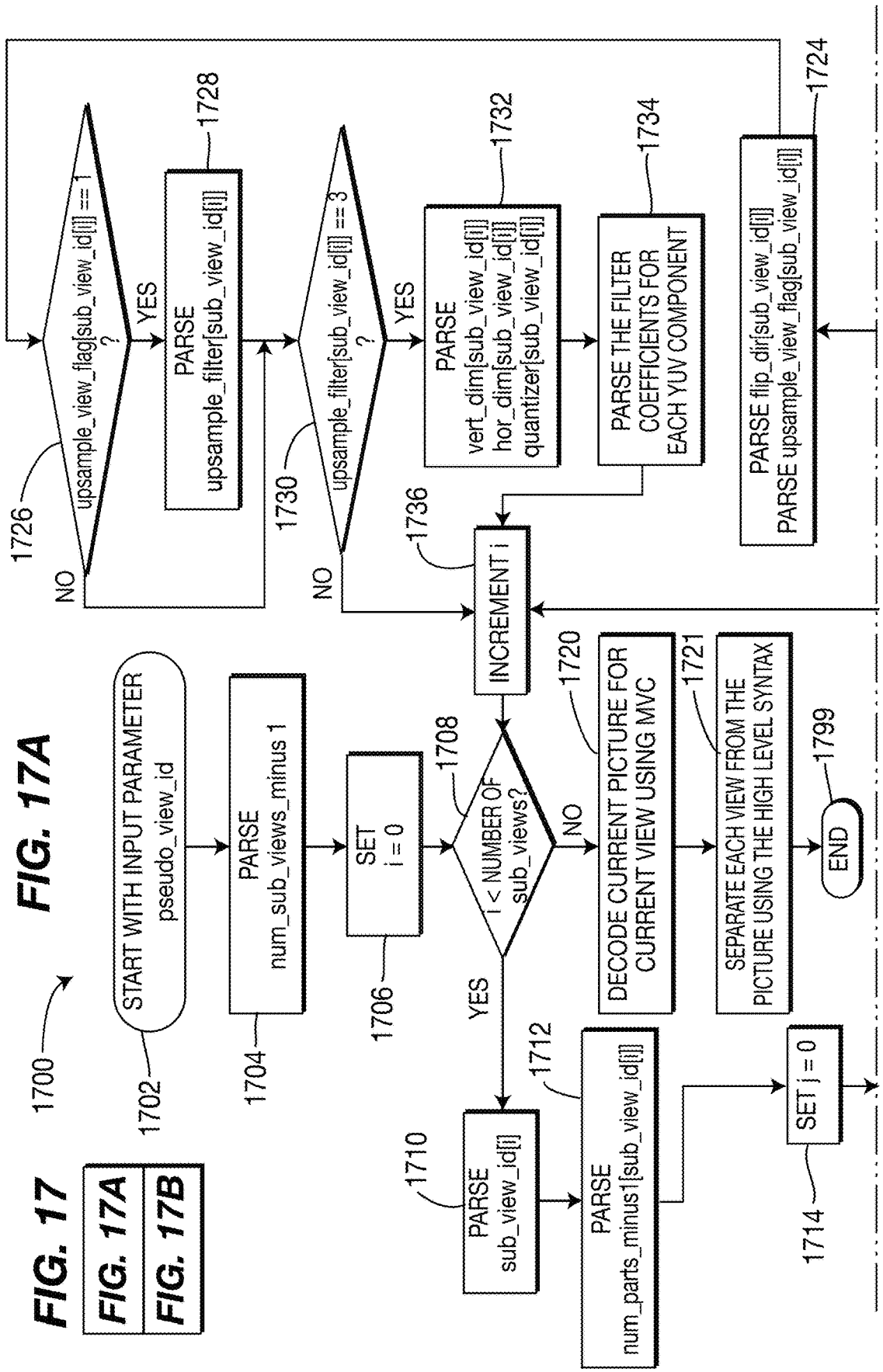

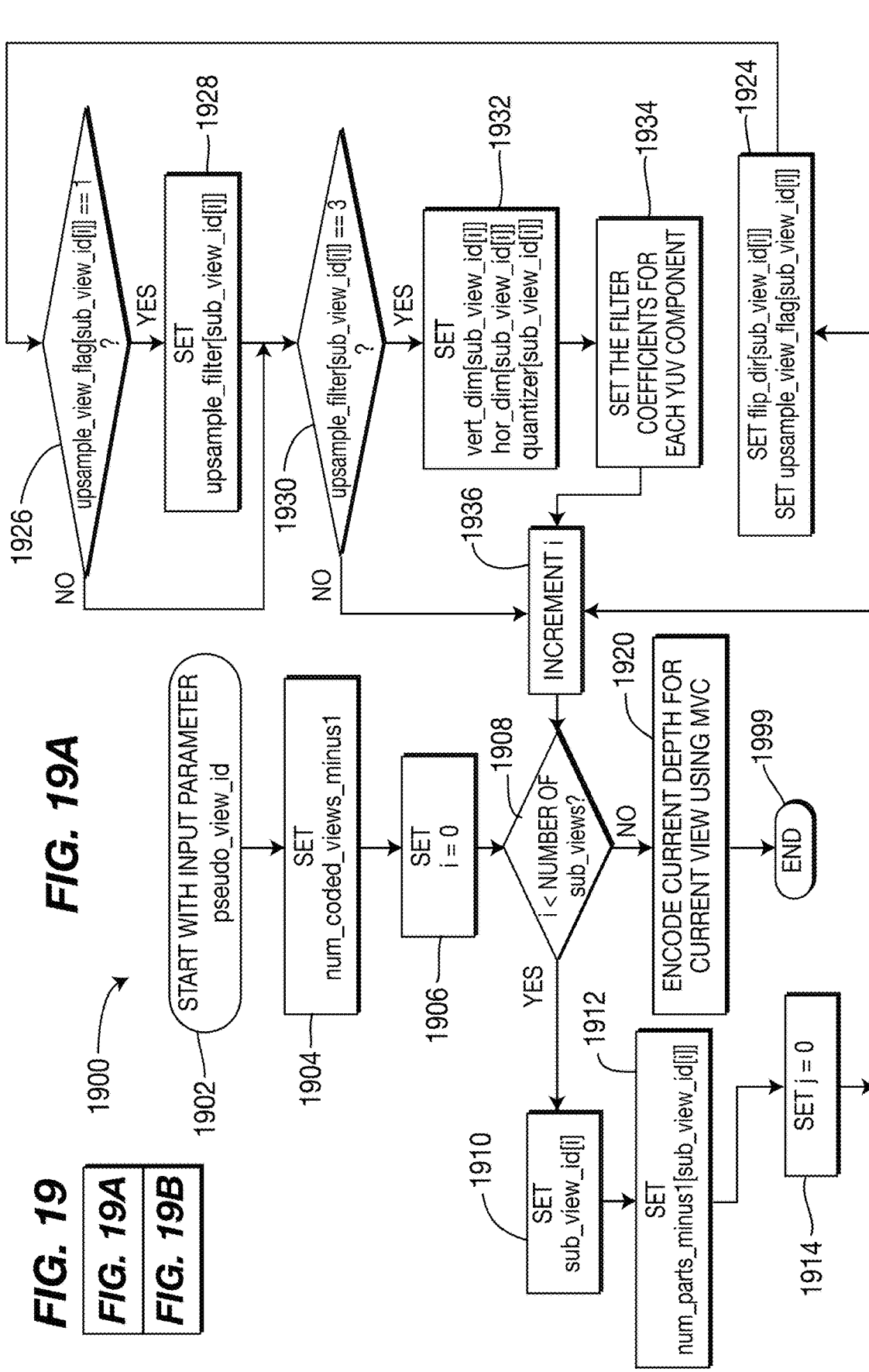

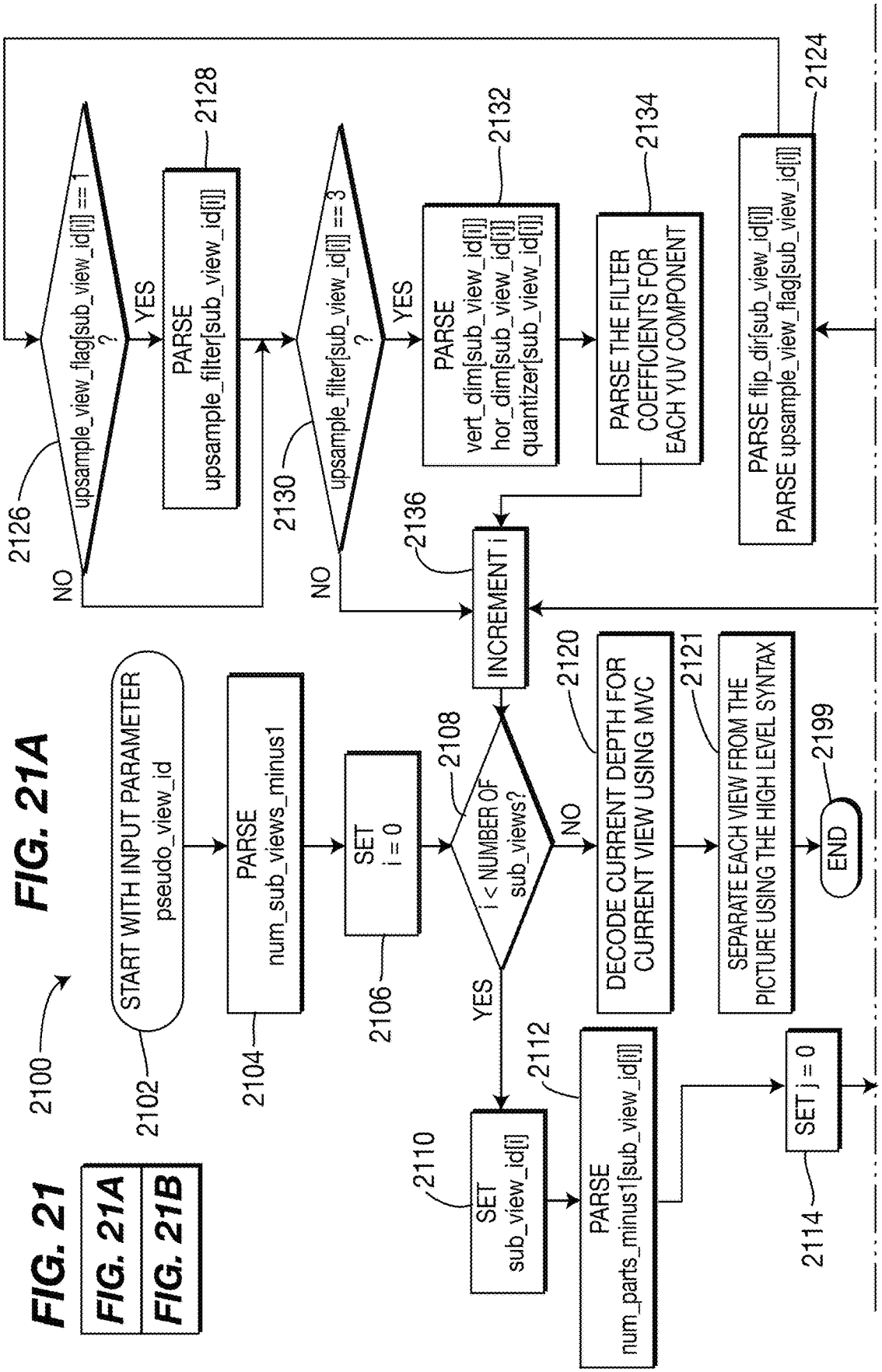

TILING IN VIDEO ENCODING AND DECODING

CROSS-REFERENCE TO RELATED APPLICATIONS

This application is a continuation of U.S. patent application Ser. No. 16/393,371, filed on Apr. 24, 2019, which is a continuation of U.S. patent application Ser. No. 16/144,971, filed on Sep. 27, 2018 (now U.S. Pat. No. 10,298,94), which is a continuation of U.S. patent application Ser. No. 15/935,869, filed on Mar. 26, 2018 (now U.S. Pat. No. 10,129,557), which is a continuation of U.S. patent application Ser. No. 15/879,280, filed on Jan. 24, 2018, (now U.S. Pat. No. 9,986,254), which is a continuation of U.S. patent application Ser. No. 15/791,238, filed on Oct. 23, 2017, (now U.S. Pat. No. 9,973,771), which is a continuation of U.S. patent application Ser. No. 15/600,338, filed on May 19, 2017, (now U.S. Pat. No. 9,838,705), which is a continuation of U.S. patent application Ser. No. 15/244,192, filed on Aug. 23, 2016, (now U.S. Pat. No. 9,706,217), which is a continuation of U.S. patent application Ser. No. 14/946,252, filed on Nov. 19, 2015, (now U.S. Pat. No. 9,445,116), which is a continuation of U.S. patent application Ser. No. 14/817,597, filed Aug. 4, 2015, (now U.S. Pat. No. 9,232,235), which is a continuation of U.S. patent application Ser. No. 14/735,371, filed Jun. 10, 2015, (now U.S. Pat. No. 9,219,923), which is a continuation of U.S. patent application Ser. No. 14/300,597, filed Jun. 10, 2014, (now U.S. Pat. No. 9,185,384), which is a continuation of U.S. patent application Ser. No. 12/450,829, filed Oct. 13, 2009, now U.S. Pat. No. 8,780,998, issued Jul. 15, 2014, which is a 371 of International Application No. PCT/US2008/004747 filed Apr. 11, 2008, which claims benefit of Provisional patent Application No. 60/925,400 filed Apr. 20, 2007 and U.S. Provisional patent Application No. 60/923,014 filed Apr. 12, 2007, herein incorporated by reference.

TECHNICAL FIELD

The present principles relate generally to video encoding and/or decoding.

BACKGROUND

Video display manufacturers may use a framework of arranging or tiling different views on a single frame. The views may then be extracted from their respective locations and rendered.

SUMMARY

According to a general aspect, a video picture is accessed that includes multiple pictures combined into a single picture. Information is accessed indicating how the multiple pictures in the accessed video picture are combined. The video picture is decoded to provide a decoded representation of the combined multiple pictures. The accessed information and the decoded video picture are provided as output.

According to another general aspect, information is generated indicating how multiple pictures included in a video picture are combined into a single picture. The video picture is encoded to provide an encoded representation of the combined multiple pictures. The generated information and encoded video picture are provided as output.

According to another general aspect, a signal or signal structure includes information indicating how multiple pictures included in a single video picture are combined into the single video picture. The signal or signal structure also includes an encoded representation of the combined multiple pictures.

According to another general aspect, a video picture is accessed that includes multiple pictures combined into a single picture. Information is accessed that indicates how the multiple pictures in the accessed video picture are combined. The video picture is decoded to provide a decoded representation of at least one of the multiple pictures. The accessed information and the decoded representation are provided as output.

According to another general aspect, a video picture is accessed that includes multiple pictures combined into a single picture. Information is accessed that indicates how the multiple pictures in the accessed video picture are combined. The video picture is decoded to provide a decoded representation of the combined multiple pictures. User input is received that selects at least one of the multiple pictures for display. A decoded output of the at least one selected picture is provided, the decoded output being provided based on the accessed information, the decoded representation, and the user input.

The details of one or more implementations are set forth in the accompanying drawings and the description below. Even if described in one particular manner, it should be clear that implementations may be configured or embodied in various manners. For example, an implementation may be performed as a method, or embodied as an apparatus configured to perform a set of operations, or embodied as an apparatus storing instructions for performing a set of operations, or embodied in a signal. Other aspects and features will become apparent from the following detailed description considered in conjunction with the accompanying drawings and the claims.

BRIEF DESCRIPTION OF THE DRAWINGS

FIGS. 5A and 5B are a flow diagram for a method for encoding pictures for a plurality of views using the MPEG-4 AVC Standard, in accordance with an embodiment of the present principles;

FIGS. 6A and 6B are a flow diagram for a method for decoding pictures for a plurality of views using the MPEG-4 AVC Standard, in accordance with an embodiment of the present principles;

FIGS. 7A and 7B are a flow diagram for a method for encoding pictures for a plurality of views and depths using the MPEG-4 AVC Standard, in accordance with an embodiment of the present principles;

FIGS. 8A and 8B are a flow diagram for a method for decoding pictures for a plurality of views and depths using the MPEG-4 AVC Standard, in accordance with an embodiment of the present principles;

FIGS. 15A and 15B are a flow diagram for a method for encoding pictures for a plurality of views using the multi-view video coding (MVC) extension of the MPEG-4 AVC Standard, in accordance with an embodiment of the present principles;

FIGS. 17A and 17B are a flow diagram for a method for decoding pictures for a plurality of views using the multi-view video coding (MVC) extension of the MPEG-4 AVC Standard, in accordance with an embodiment of the present principles;

FIGS. 19A and 19B are a flow diagram for a method for encoding pictures for a plurality of views and depths using the multi-view video coding (MVC) extension of the MPEG-4 AVC Standard, in accordance with an embodiment of the present principles;

FIGS. 21A and 21B are a flow diagram for a method for decoding pictures for a plurality of views and depths using the multi-view video coding (MVC) extension of the MPEG-4 AVC Standard, in accordance with an embodiment of the present principles;

DETAILED DESCRIPTION

Figure 1:
FIG. 1 is a diagram showing an example of four views tiled on a single frame.

Various implementations are directed to methods and apparatus for view tiling in video encoding and decoding. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" (or "one implementation") or "an embodiment" (or "an implementation") of the present principles means that a particular feature, structure, characteristic, and so forth described in connection with the embodiment is included in at least one embodiment of the present principles. Thus, the appearances of the phrase "in one embodiment" or "in an embodiment"

appearing in various places throughout the specification are not necessarily all referring to the same embodiment.

It is to be appreciated that the use of the terms "and/or" and "at least one of", for example, in the cases of "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Moreover, it is to be appreciated that while one or more embodiments of the present principles are described herein with respect to the MPEG-4 AVC standard, the present principles are not limited to solely this standard and, thus, may be utilized with respect to other standards, recommendations, and extensions thereof, particularly video coding standards, recommendations, and extensions thereof, including extensions of the MPEG-4 AVC standard, while maintaining the spirit of the present principles.

Further, it is to be appreciated that while one or more other embodiments of the present principles are described herein with respect to the multi-view video coding extension of the MPEG-4 AVC standard, the present principles are not limited to solely this extension and/or this standard and, thus, may be utilized with respect to other video coding standards, recommendations, and extensions thereof relating to multi-view video coding, while maintaining the spirit of the present principles. Multi-view video coding (MVC) is the compression framework for the encoding of multi-view sequences. A Multi-view Video Coding (MVC) sequence is a set of two or more video sequences that capture the same scene from a different view point.

Also, it is to be appreciated that while one or more other embodiments of the present principles are described herein that use depth information with respect to video content, the present principles are not limited to such embodiments and, thus, other embodiments may be implemented that do not use depth information, while maintaining the spirit of the present principles.

Additionally, as used herein, "high level syntax" refers to syntax present in the bitstream that resides hierarchically above the macroblock layer. For example, high level syntax, as used herein, may refer to, but is not limited to, syntax at the slice header level, Supplemental Enhancement Information (SEI) level, Picture Parameter Set (PPS) level, Sequence Parameter Set (SPS) level, View Parameter Set (VPS), and Network Abstraction Layer (NAL) unit header level.

In the current implementation of multi-video coding (MVC) based on the International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 Recommendation (hereinafter the "MPEG-4 AVC Standard"), the reference software achieves multi-view prediction by encoding each view with a single encoder and taking into consideration the cross-view references. Each view is coded as a separate bitstream by the encoder in its original resolution and later all the bitstreams are combined to form a single bitstream which is then decoded. Each view produces a separate YUV decoded output.

Another approach for multi-view prediction involves grouping a set of views into pseudo views. In one example of this approach, we can tile the pictures from every N views out of the total M views (sampled at the same time) on a larger frame or a super frame with possible downsampling or other operations. Turning to FIG. 1, an example of four views tiled on a single frame is indicated generally by the reference numeral 100. All four views are in their normal orientation.

Figure 2:
FIG. 2 is a diagram showing an example of four views flipped and tiled on a single frame.

Turning to FIG. 2, an example of four views flipped and tiled on a single frame is indicated generally by the reference numeral 200. The top-left view is in its normal orientation. The top-right view is flipped horizontally. The bottom-left view is flipped vertically. The bottom-right view is flipped both horizontally and vertically. Thus, if there are four views, then a picture from each view is arranged in a super-frame like a tile. This results in a single un-coded input sequence with a large resolution.

Alternatively, we can downsample the image to produce a smaller resolution. Thus, we create multiple sequences which each include different views that are tiled together. Each such sequence then forms a pseudo view, where each pseudo view includes N different tiled views. FIG. 1 shows one pseudo-view, and FIG. 2 shows another pseudo-view. These pseudo views can then be encoded using existing video coding standards such as the ISO/IEC MPEG-2 Standard and the MPEG-4 AVC Standard.

Yet another approach for multi-view prediction simply involves encoding the different views independently using a new standard and, after decoding, tiling the views as required by the player.

Further, in another approach, the views can also be tiled in a pixel wise way. For example, in a super view that is composed of four views, pixel (x, y) may be from view 0, while pixel (x+1, y) may be from view 1, pixel (x, y+1) may be from view 2, and pixel (x+1, y+1) may be from view 3.

Many displays manufacturers use such a frame work of arranging or tiling different views on a single frame and then extracting the views from their respective locations and rendering them. In such cases, there is no standard way to determine if the bitstream has such a property. Thus, if a system uses the method of tiling pictures of different views in a large frame, then the method of extracting the different views is proprietary.

However, there is no standard way to determine if the bitstream has such a property. We propose high level syntax in order to facilitate the renderer or player to extract such information in order to assist in display or other post-processing. It is also possible the sub-pictures have different resolutions and some upsampling may be needed to eventually render the view. The user may want to have the method of upsample indicated in the high level syntax as well. Additionally, parameters to change the depth focus can also be transmitted.

In an embodiment, we propose a new Supplemental Enhancement Information (SEI) message for signaling multi-view information in a MPEG-4 AVC Standard compatible bitstream where each picture includes sub-pictures which belong to a different view. The embodiment is intended, for example, for the easy and convenient display of multi-view video streams on three-dimensional (3D) monitors which may use such a framework. The concept can be extended to other video coding standards and recommendations signaling such information using high level syntax.

Moreover, in an embodiment, we propose a signaling method of how to arrange views before they are sent to the multi-view video encoder and/or decoder. Advantageously, the embodiment may lead to a simplified implementation of the multi-view coding, and may benefit the coding efficiency. Certain views can be put together and form a pseudo view or super view and then the tiled super view is treated as a normal view by a common multi-view video encoder and/or decoder, for example, as per the current MPEG-4 AVC Standard based implementation of multi-view video coding. A new flag is proposed in the Sequence Parameter Set (SPS) extension of multi-view video coding to signal the use of the technique of pseudo views. The embodiment is intended for the easy and convenient display of multi-view video streams on 3D monitors which may use such a framework.

Encoding/Decoding Using a Single-view Video Encoding/Decoding Standard/Recommendation In the current implementation of multi-video coding (MVC) based on the International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 Recommendation (hereinafter the "MPEG-4 AVC Standard"), the reference software achieves multi-view prediction by encoding each view with a single encoder and taking into consideration the cross-view references. Each view is coded as a separate bitstream by the encoder in its original resolution and later all the bitstreams are combined to form a single bitstream which is then decoded. Each view produces a separate YUV decoded output.

Another approach for multi-view prediction involves tiling the pictures from each view (sampled at the same time) on a larger frame or a super frame with a possible downsampling operation. Turning to FIG. 1, an example of four views tiled on a single frame is indicated generally by the reference numeral 100. Turning to FIG. 2, an example of four views flipped and tiled on a single frame is indicated generally by the reference numeral 200. Thus, if there are four views, then a picture from each view is arranged in a super-frame like a tile. This results in a single un-coded input sequence with a large resolution. This signal can then be encoded using existing video coding standards such as the ISO/IEC MPEG-2 Standard and the MPEG-4 AVC Standard.

Yet another approach for multi-view prediction simply involves encoding the different views independently using a new standard and, after decoding, tiling the views as required by the player.

Many displays manufacturers use such a frame work of arranging or tiling different views on a single frame and then extracting the views from their respective locations and rendering them. In such cases, there is no standard way to determine if the bitstream has such a property. Thus, if a system uses the method of tiling pictures of different views in a large frame, then the method of extracting the different views is proprietary.

Figure 3:
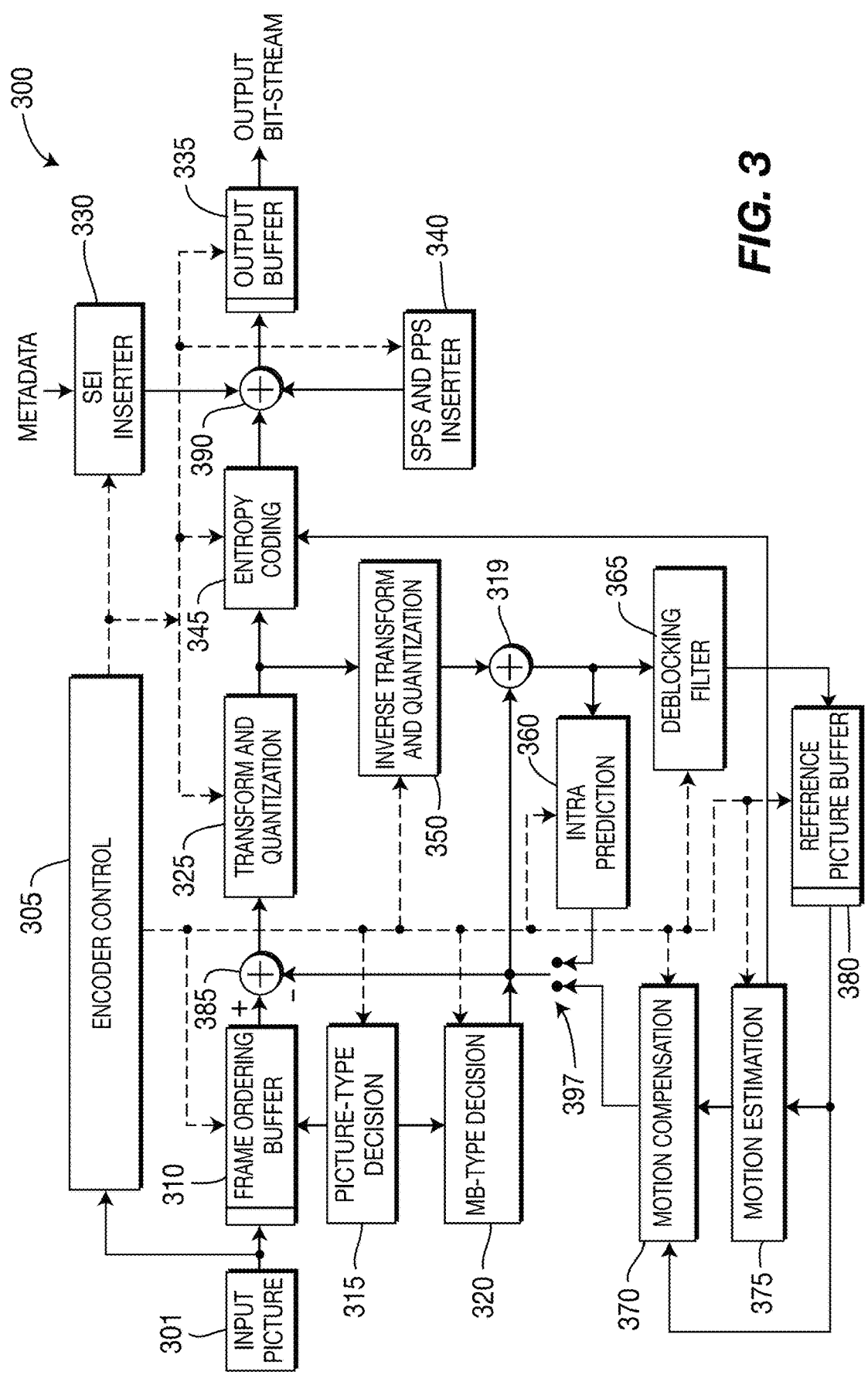
FIG. 3 shows a block diagram for a video encoder to which the present principles may be applied, in accordance with an embodiment of the present principles.

Turning to FIG. 3, a video encoder capable of performing video encoding in accordance with the MPEG-4 AVC standard is indicated generally by the reference numeral 300.

The video encoder 300 includes a frame ordering buffer 310 having an output in signal communication with a non-inverting input of a combiner 385. An output of the combiner 385 is connected in signal communication with a first input of a transformer and quantizer 325. An output of the transformer and quantizer 325 is connected in signal communication with a first input of an entropy coder 345 and a first input of an inverse transformer and inverse quantizer 350. An output of the entropy coder 345 is connected in signal communication with a first non-inverting input of a combiner 390. An output of the combiner 390 is connected in signal communication with a first input of an output buffer 335.

A first output of an encoder controller 305 is connected in signal communication with a second input of the frame ordering buffer 310, a second input of the inverse transformer and inverse quantizer 350, an input of a picture-type decision module 315, an input of a macroblock-type (MB-type) decision module 320, a second input of an intra prediction module 360, a second input of a deblocking filter 365, a first input of a motion compensator 370, a first input of a motion estimator 375, and a second input of a reference picture buffer 380.

A second output of the encoder controller 305 is connected in signal communication with a first input of a Supplemental Enhancement Information (SEI) inserter 330, a second input of the transformer and quantizer 325, a second input of the entropy coder 345, a second input of the output buffer 335, and an input of the Sequence Parameter Set (SPS) and Picture Parameter Set (PPS) inserter 340.

A first output of the picture-type decision module 315 is connected in signal communication with a third input of a frame ordering buffer 310. A second output of the picture-type decision module 315 is connected in signal communication with a second input of a macroblock-type decision module 320.

An output of the Sequence Parameter Set (SPS) and Picture Parameter Set (PPS) inserter 340 is connected in signal communication with a third non-inverting input of the combiner 390. An output of the SEI Inserter 330 is connected in signal communication with a second non-inverting input of the combiner 390.

An output of the inverse quantizer and inverse transformer 350 is connected in signal communication with a first non-inverting input of a combiner 319. An output of the combiner 319 is connected in signal communication with a first input of the intra prediction module 360 and a first input of the deblocking filter 365. An output of the deblocking filter 365 is connected in signal communication with a first input of a reference picture buffer 380. An output of the reference picture buffer 380 is connected in signal communication with a second input of the motion estimator 375 and with a first input of a motion compensator 370. A first output of the motion estimator 375 is connected in signal communication with a second input of the motion compensator 370. A second output of the motion estimator 375 is connected in signal communication with a third input of the entropy coder 345.

An output of the motion compensator 370 is connected in signal communication with a first input of a switch 397. An output of the intra prediction module 360 is connected in signal communication with a second input of the switch 397. An output of the macroblock-type decision module 320 is connected in signal communication with a third input of the switch 397 in order to provide a control input to the switch 397. The third input of the switch 397 determines whether or not the "data" input of the switch (as compared to the control input, i.e., the third input) is to be provided by the motion compensator 370 or the intra prediction module 360. The output of the switch 397 is connected in signal communication with a second non-inverting input of the combiner 319 and with an inverting input of the combiner 385.

Inputs of the frame ordering buffer 310 and the encoder controller 105 are available as input of the encoder 300, for receiving an input picture 301. Moreover, an input of the Supplemental Enhancement Information (SEI) inserter 330 is available as an input of the encoder 300, for receiving metadata. An output of the output buffer 335 is available as an output of the encoder 300, for outputting a bitstream.

Figure 4:
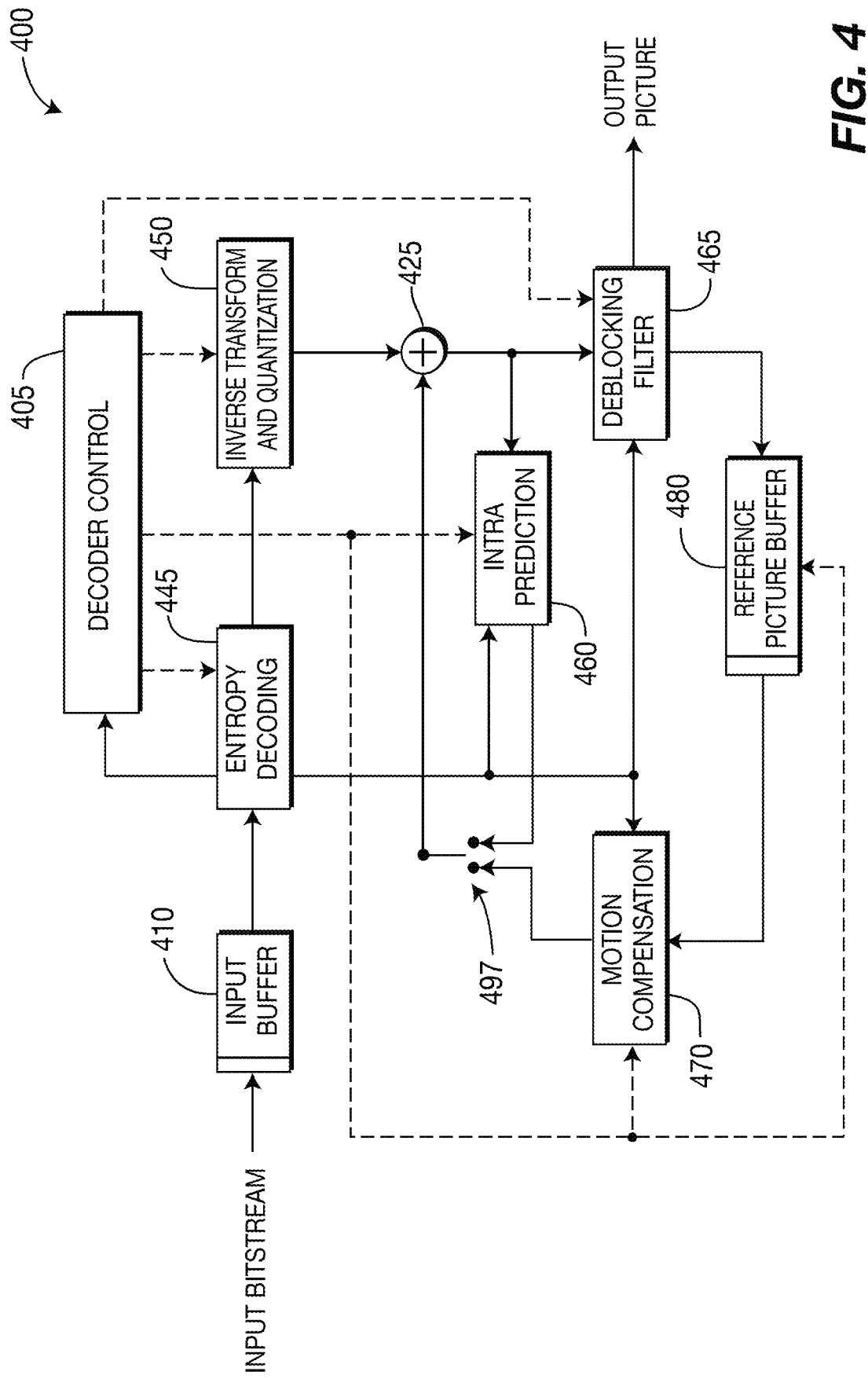
FIG. 4 shows a block diagram for a video decoder to which the present principles may be applied, in accordance with an embodiment of the present principles.

Turning to FIG. 4, a video decoder capable of performing video decoding in accordance with the MPEG-4 AVC standard is indicated generally by the reference numeral 400.

The video decoder 400 includes an input buffer 410 having an output connected in signal communication with a first input of the entropy decoder 445. A first output of the entropy decoder 445 is connected in signal communication with a first input of an inverse transformer and inverse quantizer 450. An output of the inverse transformer and inverse quantizer 450 is connected in signal communication with a second non-inverting input of a combiner 425. An output of the combiner 425 is connected in signal communication with a second input of a deblocking filter 465 and a first input of an intra prediction module 460. A second output of the deblocking filter 465 is connected in signal communication with a first input of a reference picture buffer 480. An output of the reference picture buffer 480 is connected in signal communication with a second input of a motion compensator 470.

A second output of the entropy decoder 445 is connected in signal communication with a third input of the motion compensator 470 and a first input of the deblocking filter 465. A third output of the entropy decoder 445 is connected in signal communication with an input of a decoder controller 405. A first output of the decoder controller 405 is connected in signal communication with a second input of the entropy decoder 445. A second output of the decoder controller 405 is connected in signal communication with a second input of the inverse transformer and inverse quantizer 450. A third output of the decoder controller 405 is connected in signal communication with a third input of the deblocking filter 465. A fourth output of the decoder controller 405 is connected in signal communication with a second input of the intra prediction module 460, with a first input of the motion compensator 470, and with a second input of the reference picture buffer 480.

An output of the motion compensator 470 is connected in signal communication with a first input of a switch 497. An output of the intra prediction module 460 is connected in signal communication with a second input of the switch 497. An output of the switch 497 is connected in signal communication with a first non-inverting input of the combiner 425.

An input of the input buffer 410 is available as an input of the decoder 400, for receiving an input bitstream. A first output of the deblocking filter 465 is available as an output of the decoder 400, for outputting an output picture.

Figure 5B:
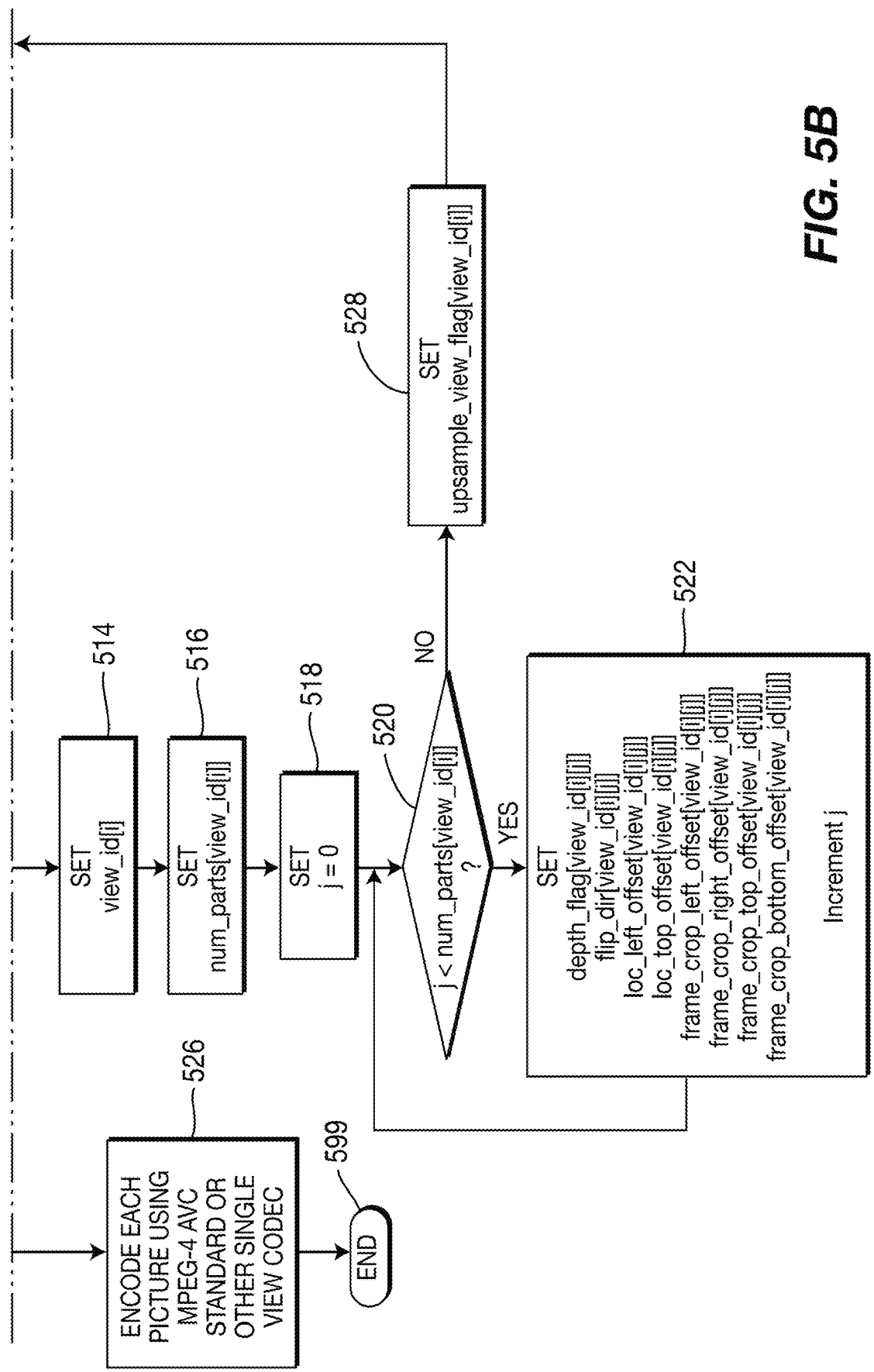

Turning to FIG. 5, including FIGS. 5A and 5B, an exemplary method for encoding pictures for a plurality of views using the MPEG-4 AVC Standard is indicated generally by the reference numeral 500.

The method 500 includes a start block 502 that passes control to a function block 504. The function block 504 arranges each view at a particular time instance as a sub-picture in tile format, and passes control to a function block 506. The function block 506 sets a syntax element num_coded_views_minus1, and passes control to a function block 508. The function block 508 sets syntax elements org_pic_width_in_mbs_minus1 and org_pic_height_in_mbs_minus1, and passes control to a function block 510. The function block 510 sets a variable i equal to zero, and passes control to a decision block 512. The decision block 512 determines whether or not the variable i is less than the number of views. If so, then control is passed to a function block 514. Otherwise, control is passed to a function block 524.

The function block 514 sets a syntax element view_id[i], and passes control to a function block 516. The function block 516 sets a syntax element num_parts[view_id[i]], and passes control to a function block 518. The function block 518 sets a variable j equal to zero, and passes control to a decision block 520. The decision block 520 determines whether or not the current value of the variable j is less than the current value of the syntax element num_parts[view_id[i]]. If so, then control is passed to a function block 522. Otherwise, control is passed to a function block 528.

The function block 522 sets the following syntax elements, increments the variable j, and then returns control to the decision block 520: depth_flag[view_id[i]][j]; flip_dir[view_id[i]][j]; loc_left_offset[view_id[i]][j]; loc_top_offset[view_id[i]][j]; frame_crop_left_offset[view_id[i]][j]; frame_crop_right_offset[view_id[i]][j]; frame_crop_top_offset[view_id[i]][j]; and frame_crop_bottom_offset[view_id[i]][j].

The function block 528 sets a syntax element upsample_view_flag[view_id[i]], and passes control to a decision block 530. The decision block 530 determines whether or not the current value of the syntax element upsample_view_flag[view_id[i]] is equal to one. If so, then control is passed to a function block 532. Otherwise, control is passed to a decision block 534.

The function block 532 sets a syntax element upsample_filter[view_id[i]], and passes control to the decision block 534.

The decision block 534 determines whether or not the current value of the syntax element upsample_filter[view_id[i]] is equal to three. If so, then control is passed to a function block 536. Otherwise, control is passed to a function block 540.

The function block 536 sets the following syntax elements and passes control to a function block 538: vert_dim[view_id[i]]; hor_dim[view_id[i]]; and quantizer[view_id[i]].

The function block 538 sets the filter coefficients for each YUV component, and passes control to the function block 540.

The function block 540 increments the variable i, and returns control to the decision block 512.

The function block 524 writes these syntax elements to at least one of the Sequence Parameter Set (SPS), Picture Parameter Set (PPS), Supplemental Enhancement Information (SEI) message, Network Abstraction Layer (NAL) unit header, and slice header, and passes control to a function block 526. The function block 526 encodes each picture using the MPEG-4 AVC Standard or other single view codec, and passes control to an end block 599.

Figure 6B:
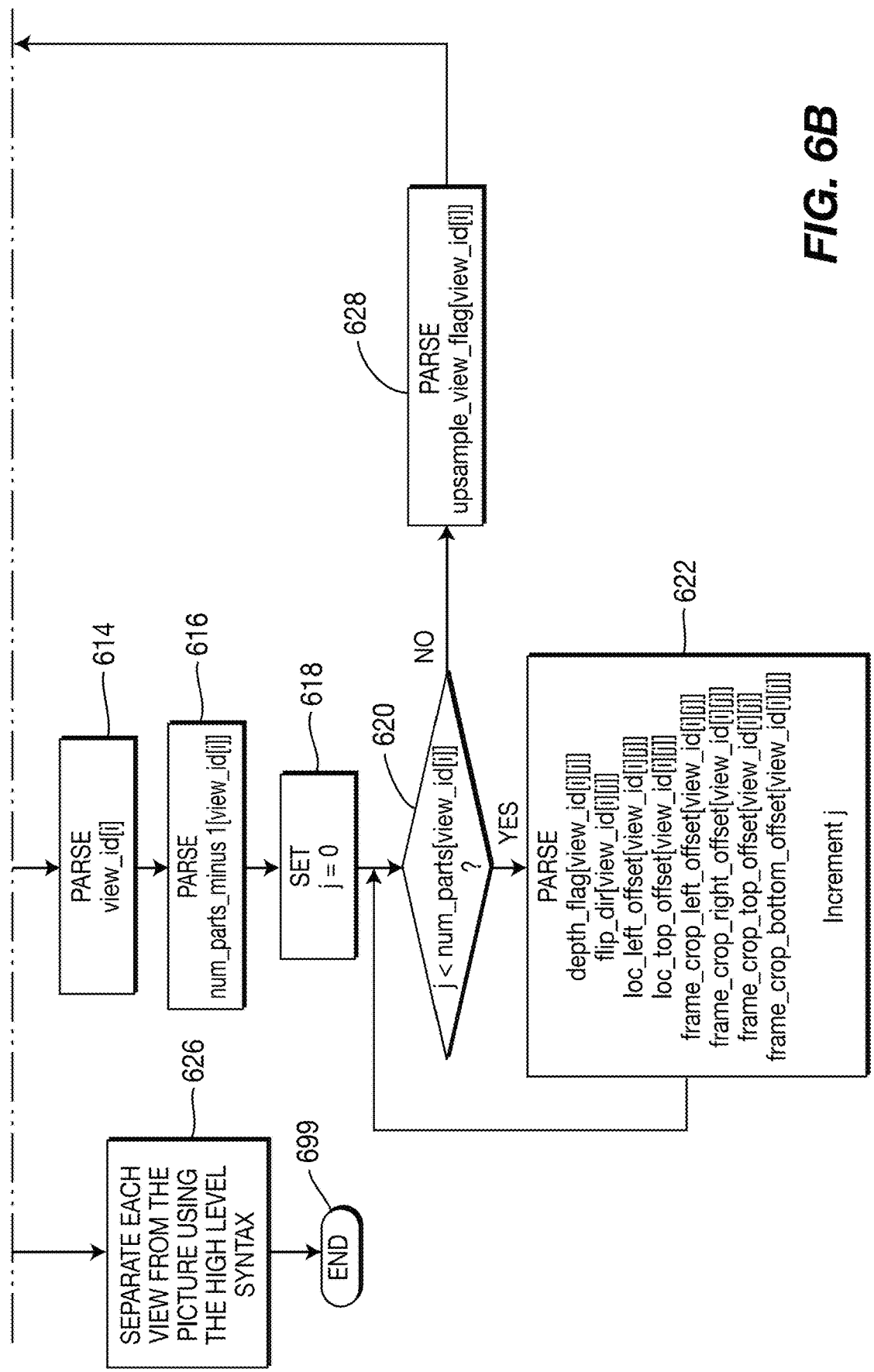

Turning to FIG. 6, including FIGS. 6A and 6B, an exemplary method for decoding pictures for a plurality of views using the MPEG-4 AVC Standard is indicated generally by the reference numeral 600.

The method 600 includes a start block 602 that passes control to a function block 604. The function block 604 parses the following syntax elements from at least one of the Sequence Parameter Set (SPS), Picture Parameter Set (PPS), Supplemental Enhancement Information (SEI) message, Network Abstraction Layer (NAL) unit header, and slice header, and passes control to a function block 606. The function block 606 parses a syntax element num_coded_views_minus1, and passes control to a function block 608. The function block 608 parses syntax elements org_pic_width_in_mbs_minus1 and org_pic_height_in_mbs_minus1, and passes control to a function block 610. The function block 610 sets a variable i equal to zero, and passes control to a decision block 612. The decision block 612 determines whether or not the variable i is less than the number of views. If so, then control is passed to a function block 614. Otherwise, control is passed to a function block 624.

The function block 614 parses a syntax element view_id[i], and passes control to a function block 616. The function block 616 parses a syntax element num_parts_minus1[view_id[i]], and passes control to a function block 618. The function block 618 sets a variable j equal to zero, and passes control to a decision block 620. The decision block 620 determines whether or not the current value of the variable j is less than the current value of the syntax element num_parts[view_id[i]]. If so, then control is passed to a function block 622. Otherwise, control is passed to a function block 628.

The function block 622 parses the following syntax elements, increments the variable j, and then returns control to the decision block 620: depth_flag[view_id[i]][j]; flip_dir[view_id[i]][j]; loc_left_offset[view_id[i]][j]; loc_top_offset[view_id[i]][j]; frame_crop_left_offset[view_id[i]][j]; frame_crop_right_offset[view_id[i]][j]; frame_crop_top_offset[view_id[i]][j]; and frame_crop_bottom_offset[view_id[i]][j].

The function block 628 parses a syntax element upsample_view_flag[view_id[i]], and passes control to a decision block 630. The decision block 630 determines whether or not the current value of the syntax element upsample_view_flag[view_id[i]] is equal to one. If so, then control is passed to a function block 632. Otherwise, control is passed to a decision block 634.

The function block 632 parses a syntax element upsample_filter[view_id[i]], and passes control to the decision block 634.

The decision block 634 determines whether or not the current value of the syntax element upsample_filter[view_id[i]] is equal to three. If so, then control is passed to a function block 636. Otherwise, control is passed to a function block 640.

The function block 636 parses the following syntax elements and passes control to a function block 638: vert_dim[view_id[i]]; hor_dim[view_id[i]]; and quantizer[view_id[i]].

The function block 638 parses the filter coefficients for each YUV component, and passes control to the function block 640.

The function block 640 increments the variable i, and returns control to the decision block 612.

The function block 624 decodes each picture using the MPEG-4 AVC Standard or other single view codec, and passes control to a function block 626. The function block 626 separates each view from the picture using the high level syntax, and passes control to an end block 699.

Figure 7B:
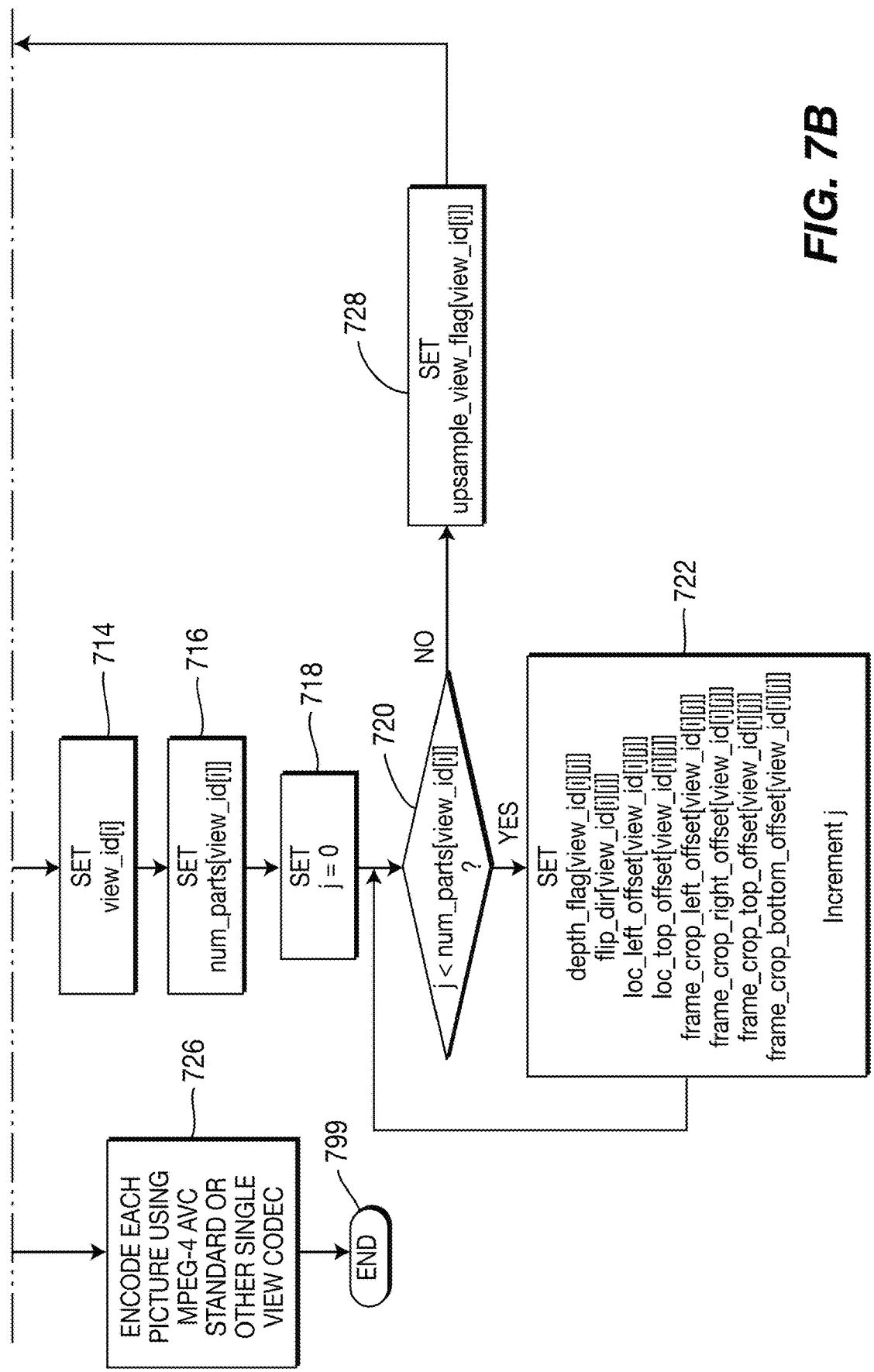

Turning to FIG. 7, including FIGS. 7A and 7B, an exemplary method for encoding pictures for a plurality of views and depths using the MPEG-4 AVC Standard is indicated generally by the reference numeral 700.

The method 700 includes a start block 702 that passes control to a function block 704. The function block 704 arranges each view and corresponding depth at a particular time instance as a sub-picture in tile format, and passes control to a function block 706. The function block 706 sets a syntax element num_coded_views_minus1, and passes control to a function block 708. The function block 708 sets syntax elements org_pic_width_in_mbs_minus1 and org_pic_height_in_mbs_minus1, and passes control to a function block 710. The function block 710 sets a variable i equal to zero, and passes control to a decision block 712. The decision block 712 determines whether or not the variable i is less than the number of views. If so, then control is passed to a function block 714. Otherwise, control is passed to a function block 724.

The function block 714 sets a syntax element view_id[i], and passes control to a function block 716. The function block 716 sets a syntax element num_parts[view_id[i]], and passes control to a function block 718. The function block 718 sets a variable j equal to zero, and passes control to a decision block 720. The decision block 720 determines whether or not the current value of the variable j is less than the current value of the syntax element num_parts[view_id[i]]. If so, then control is passed to a function block 722. Otherwise, control is passed to a function block 728.

The function block 722 sets the following syntax elements, increments the variable j, and then returns control to the decision block 720: depth_flag[view_id[i]][j]; flip_dir[view_id[i]][j]; loc_left_offset[view_id[i]][j]; loc_top_offset[view_id[i]][j]; frame_crop_left_offset[view_id[i]][j]; frame_crop_right_offset[view_id[i]][j]; frame_crop_top_offset[view_id[i]][j]; and frame_crop_bottom_offset[view_id[i]][j].

The function block 728 sets a syntax element upsample_view_flag[view_id[i]], and passes control to a decision block 730. The decision block 730 determines whether or not the current value of the syntax element upsample_view_flag[view_id[i]] is equal to one. If so, then control is passed to a function block 732. Otherwise, control is passed to a decision block 734.

The function block 732 sets a syntax element upsample_filter[view_id[i]], and passes control to the decision block 734.

The decision block 734 determines whether or not the current value of the syntax element upsample_filter[view_id[i]] is equal to three. If so, then control is passed to a function block 736. Otherwise, control is passed to a function block 740.

The function block 736 sets the following syntax elements and passes control to a function block 738: vert_dim[view_id[i]]; hor_dim[view_id[i]]; and quantizer[view_id[i]].

The function block 738 sets the filter coefficients for each YUV component, and passes control to the function block 740.

The function block 740 increments the variable i, and returns control to the decision block 712.

The function block 724 writes these syntax elements to at least one of the Sequence Parameter Set (SPS), Picture Parameter Set (PPS), Supplemental Enhancement Information (SEI) message, Network Abstraction Layer (NAL) unit header, and slice header, and passes control to a function block 726. The function block 726 encodes each picture using the MPEG-4 AVC Standard or other single view codec, and passes control to an end block 799.

Figure 8B:
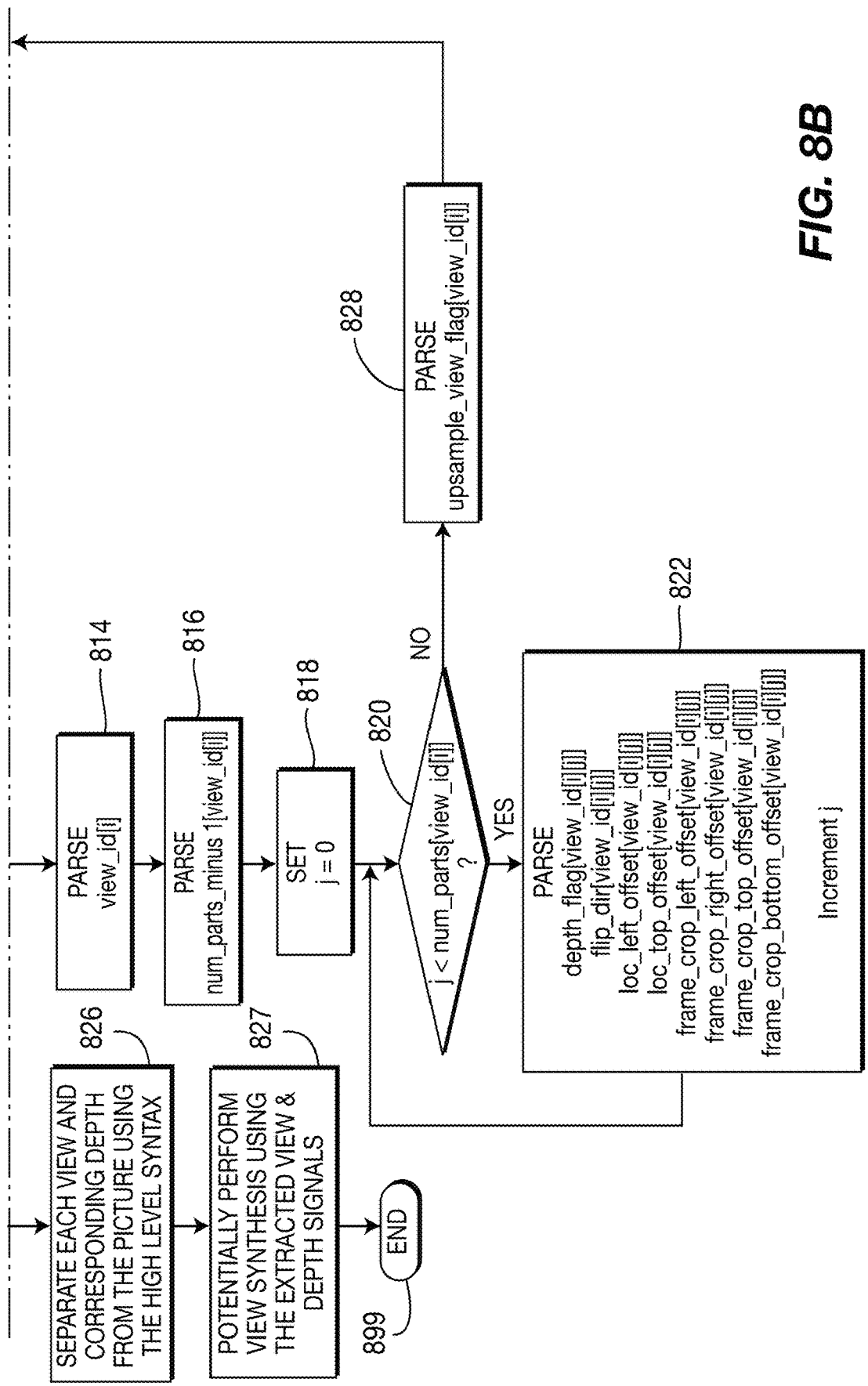

Turning to FIG. 8, including FIGS. 8A and 8B, an exemplary method for decoding pictures for a plurality of views and depths using the MPEG-4 AVC Standard is indicated generally by the reference numeral 800.

The method 800 includes a start block 802 that passes control to a function block 804. The function block 804 parses the following syntax elements from at least one of the Sequence Parameter Set (SPS), Picture Parameter Set (PPS), Supplemental Enhancement Information (SEI) message, Network Abstraction Layer (NAL) unit header, and slice header, and passes control to a function block 806. The function block 806 parses a syntax element num_coded_views_minus1, and passes control to a function block 808. The function block 808 parses syntax elements org_pic_width_in_mbs_minus1 and org_pic_height_in_mbs_minus1, and passes control to a function block 810. The function block 810 sets a variable i equal to zero, and passes control to a decision block 812. The decision block 812 determines whether or not the variable i is less than the number of views. If so, then control is passed to a function block 814. Otherwise, control is passed to a function block 824.

The function block 814 parses a syntax element view_id [i], and passes control to a function block 816. The function block 816 parses a syntax element num_parts_minus1 [view_id[i]], and passes control to a function block 818. The function block 818 sets a variable j equal to zero, and passes control to a decision block 820. The decision block 820 determines whether or not the current value of the variable j is less than the current value of the syntax element num_parts[view_id[i]]. If so, then control is passed to a function block 822. Otherwise, control is passed to a function block 828.

The function block 822 parses the following syntax elements, increments the variable j, and then returns control to the decision block 820: depth_flag[view_id[i]][j]; flip_dir [view_id[i]][j]; loc_left_offset[view_id[i]][j]; loc_top_offset[view_id[i]][j]; frame_crop_left_offset[view_id[i]][j]; frame_crop_right_offset[view_id[i]][j]; frame_crop_top_offset[view_id[i]][j]; and frame_crop_bottom_offset [view_id[i]][j].

The function block 828 parses a syntax element upsample_view_flag[view_id[i]], and passes control to a decision block 830. The decision block 830 determines whether or not the current value of the syntax element upsample_view_flag[view_id[i]] is equal to one. If so, then control is passed to a function block 832. Otherwise, control is passed to a decision block 834.

The function block 832 parses a syntax element upsample_filter[view_id[i]], and passes control to the decision block 834.

The decision block 834 determines whether or not the current value of the syntax element upsample_filter[view_id [i]] is equal to three. If so, then control is passed to a function block 836. Otherwise, control is passed to a function block 840.

The function block 836 parses the following syntax elements and passes control to a function block 838: vert_dim[view_id[i]]; hor_dim[view_id[i]]; and quantizer [view_id[i]].

The function block 838 parses the filter coefficients for each YUV component, and passes control to the function block 840.

The function block 840 increments the variable i, and returns control to the decision block 812.

The function block 824 decodes each picture using the MPEG-4 AVC Standard or other single view codec, and passes control to a function block 826. The function block 826 separates each view and corresponding depth from the picture using the high level syntax, and passes control to a function block 827. The function block 827 potentially performs view synthesis using the extracted view and depth signals, and passes control to an end block 899.

Figure 9:
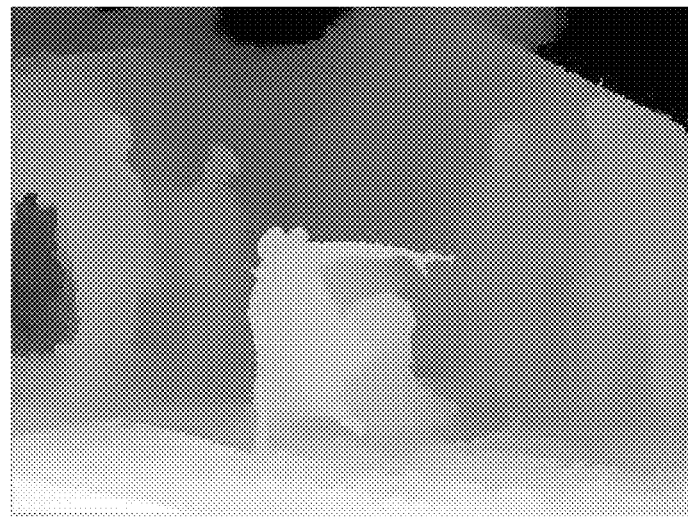
FIG. 9 is a diagram showing an example of a depth signal, in accordance with an embodiment of the present principles.
Figure 10:
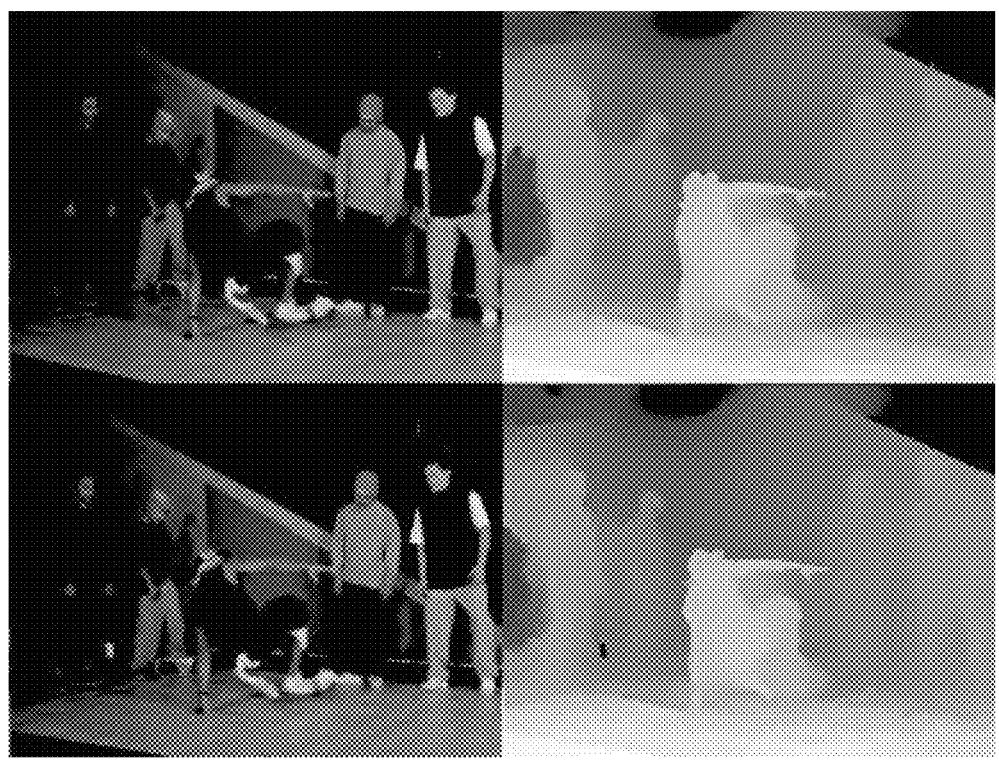
FIG. 10 is a diagram showing an example of a depth signal added as a tile, in accordance with an embodiment of the present principles.

With respect to the depth used in FIGS. 7 and 8, FIG. 9 shows an example of a depth signal 900, where depth is provided as a pixel value for each corresponding location of an image (not shown). Further, FIG. 10 shows an example of two depth signals included in a tile 1000. The top-right portion of tile 1000 is a depth signal having depth values corresponding to the image on the top-left of tile 1000. The bottom-right portion of tile 1000 is a depth signal having depth values corresponding to the image on the bottom-left of tile 1000.

Figure 11:
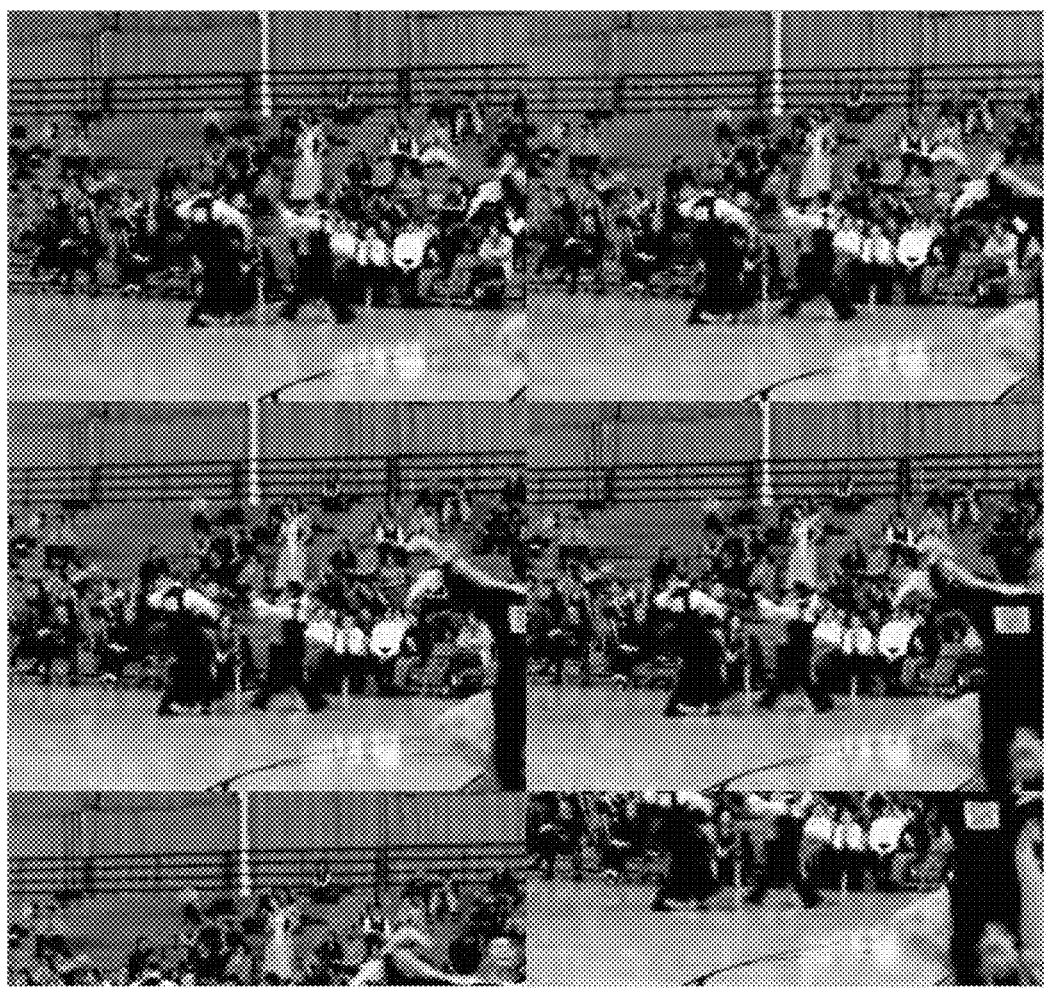
FIG. 11 is a diagram showing an example of 5 views tiled on a single frame, in accordance with an embodiment of the present principles.

Turning to FIG. 11, an example of 5 views tiled on a single frame is indicated generally by the reference numeral 1100. The top four views are in a normal orientation. The fifth view is also in a normal orientation, but is split into two portions along the bottom of tile 1100. A left-portion of the fifth view shows the "top" of the fifth view, and a right-portion of the fifth view shows the "bottom" of the fifth view.

Figure 12:
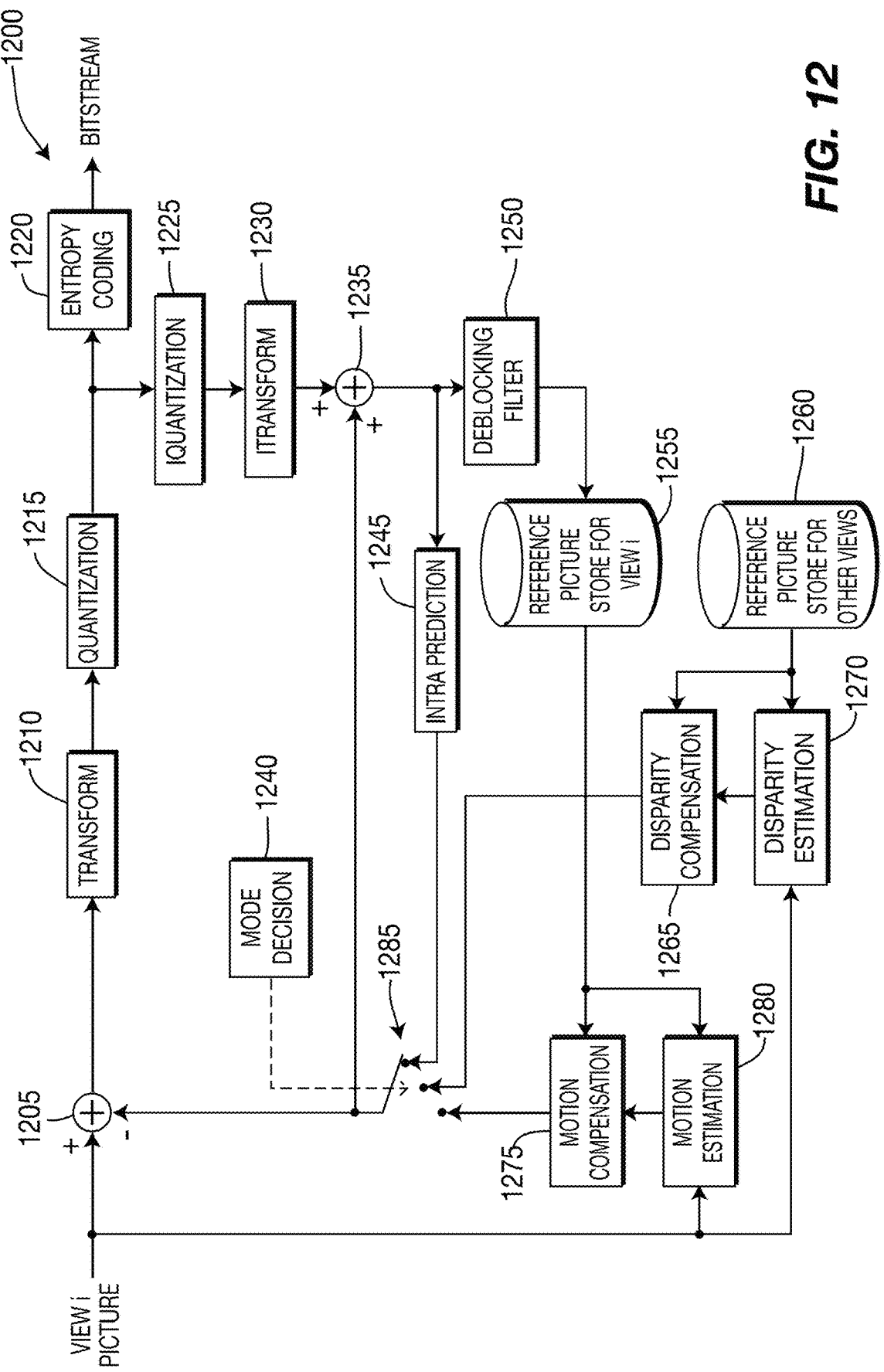
FIG. 12 is a block diagram for an exemplary Multi-view Video Coding (MVC) encoder to which the present principles may be applied, in accordance with an embodiment of the present principles.

Encoding/Decoding Using a Multi-view Video Encoding/Decoding Standard/Recommendation Turning to FIG. 12, an exemplary Multi-view Video Coding (MVC) encoder is indicated generally by the reference numeral 1200. The encoder 1200 includes a combiner 1205 having an output connected in signal communication with an input of a transformer 1210. An output of the transformer 1210 is connected in signal communication with an input of quantizer 1215. An output of the quantizer 1215 is connected in signal communication with an input of an entropy coder 1220 and an input of an inverse quantizer 1225. An output of the inverse quantizer 1225 is connected in signal communication with an input of an inverse transformer 1230. An output of the inverse transformer 1230 is connected in signal communication with a first non-inverting input of a combiner 1235. An output of the combiner 1235 is connected in signal communication with an input of an intra predictor 1245 and an input of a deblocking filter 1250. An output of the deblocking filter 1250 is connected in signal communication with an input of a reference picture store 1255 (for view i). An output of the reference picture store 1255 is connected in signal communication with a first input of a motion compensator 1275 and a first input of a motion estimator 1280. An output of the motion estimator 1280 is connected in signal communication with a second input of the motion compensator 1275

An output of a reference picture store 1260 (for other views) is connected in signal communication with a first input of a disparity estimator 1270 and a first input of a disparity compensator 1265. An output of the disparity estimator 1270 is connected in signal communication with a second input of the disparity compensator 1265.

An output of the entropy decoder 1220 is available as an output of the encoder 1200. A non-inverting input of the combiner 1205 is available as an input of the encoder 1200, and is connected in signal communication with a second input of the disparity estimator 1270, and a second input of the motion estimator 1280. An output of a switch 1285 is connected in signal communication with a second non-inverting input of the combiner 1235 and with an inverting input of the combiner 1205. The switch 1285 includes a first input connected in signal communication with an output of the motion compensator 1275, a second input connected in signal communication with an output of the disparity compensator 1265, and a third input connected in signal communication with an output of the intra predictor 1245.

A mode decision module 1240 has an output connected to the switch 1285 for controlling which input is selected by the switch 1285.

Figure 13:
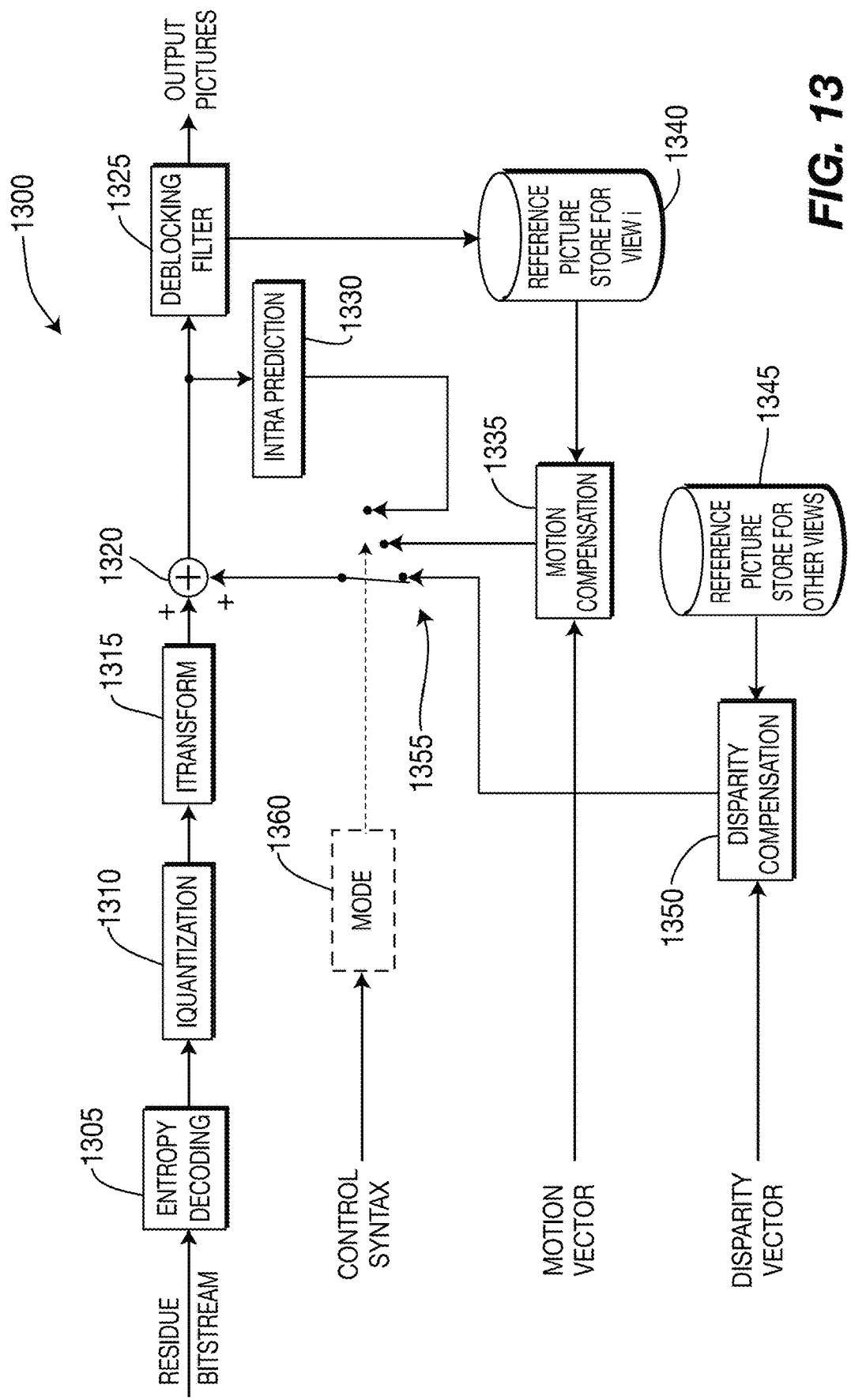
FIG. 13 is a block diagram for an exemplary Multi-view Video Coding (MVC) decoder to which the present principles may be applied, in accordance with an embodiment of the present principles.

Turning to FIG. 13, an exemplary Multi-view Video Coding (MVC) decoder is indicated generally by the reference numeral 1300. The decoder 1300 includes an entropy decoder 1305 having an output connected in signal communication with an input of an inverse quantizer 1310. An output of the inverse quantizer is connected in signal communication with an input of an inverse transformer 1315. An output of the inverse transformer 1315 is connected in signal communication with a first non-inverting input of a combiner 1320. An output of the combiner 1320 is connected in signal communication with an input of a deblocking filter 1325 and an input of an intra predictor 1330. An output of the deblocking filter 1325 is connected in signal communication with an input of a reference picture store 1340 (for view i). An output of the reference picture store 1340 is connected in signal communication with a first input of a motion compensator 1335.

An output of a reference picture store 1345 (for other views) is connected in signal communication with a first input of a disparity compensator 1350.

An input of the entropy coder 1305 is available as an input to the decoder 1300, for receiving a residue bitstream. Moreover, an input of a mode module 1360 is also available as an input to the decoder 1300, for receiving control syntax to control which input is selected by the switch 1355. Further, a second input of the motion compensator 1335 is available as an input of the decoder 1300, for receiving motion vectors. Also, a second input of the disparity compensator 1350 is available as an input to the decoder 1300, for receiving disparity vectors.

An output of a switch 1355 is connected in signal communication with a second non-inverting input of the combiner 1320. A first input of the switch 1355 is connected in signal communication with an output of the disparity compensator 1350. A second input of the switch 1355 is connected in signal communication with an output of the motion compensator 1335. A third input of the switch 1355 is connected in signal communication with an output of the intra predictor 1330. An output of the mode module 1360 is connected in signal communication with the switch 1355 for controlling which input is selected by the switch 1355. An output of the deblocking filter 1325 is available as an output of the decoder 1300.

Figure 14:
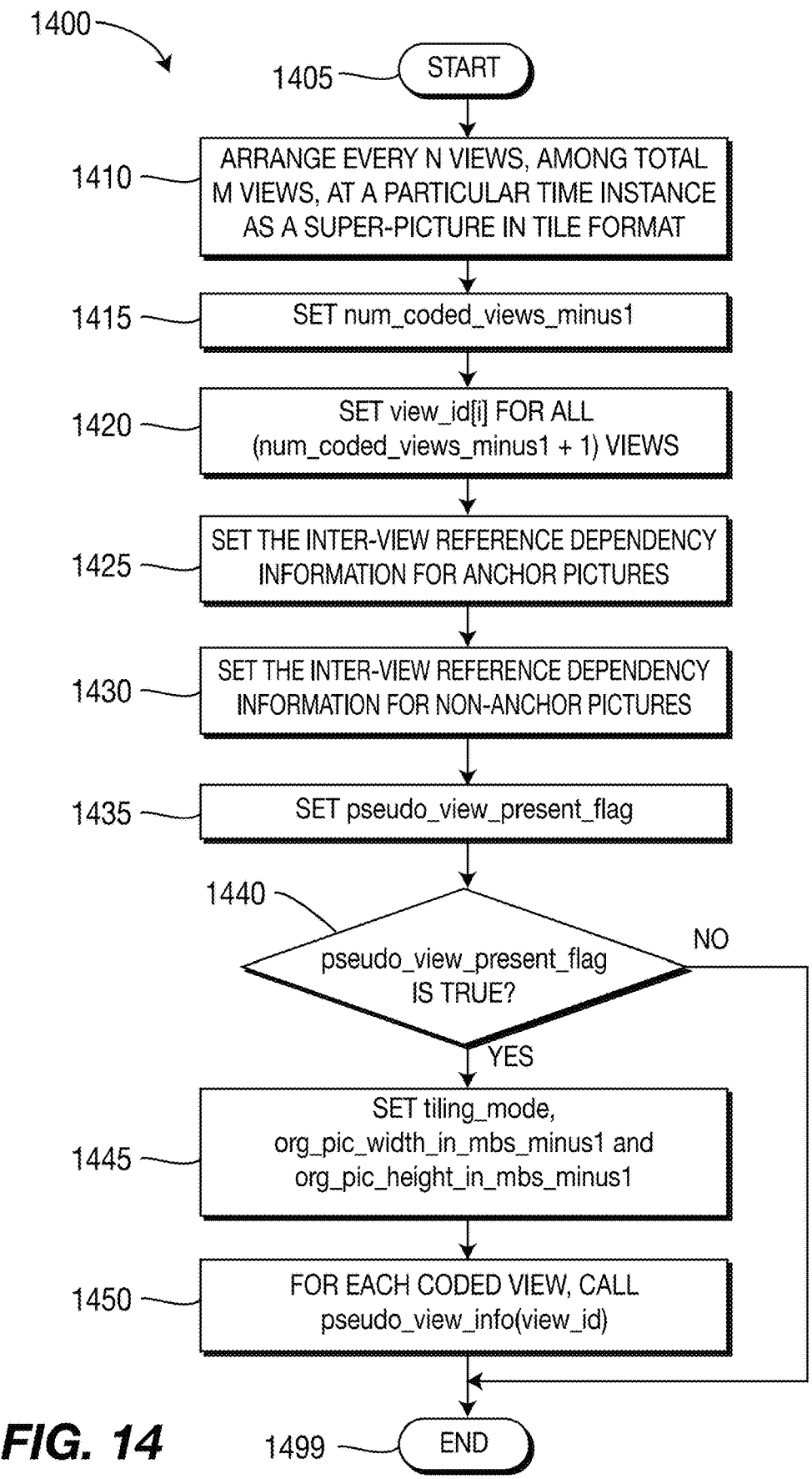
FIG. 14 is a flow diagram for a method for processing pictures for a plurality of views in preparation for encoding the pictures using the multi-view video coding (MVC) extension of the MPEG-4 AVC Standard, in accordance with an embodiment of the present principles.

Turning to FIG. 14, an exemplary method for processing pictures for a plurality of views in preparation for encoding the pictures using the multi-view video coding (MVC) extension of the MPEG-4 AVC Standard is indicated generally by the reference numeral 1400.

The method 1400 includes a start block 1405 that passes control to a function block 1410. The function block 1410 arranges every N views, among a total of M views, at a particular time instance as a super-picture in tile format, and passes control to a function block 1415. The function block 1415 sets a syntax element num_coded_views_minus1, and passes control to a function block 1420. The function block 1420 sets a syntax element view_id[i] for all (num_coded_views_minus1+1) views, and passes control to a function block 1425. The function block 1425 sets the inter-view reference dependency information for anchor pictures, and passes control to a function block 1430. The function block 1430 sets the inter-view reference dependency information for non-anchor pictures, and passes control to a function block 1435. The function block 1435 sets a syntax element pseudo_view_present_flag, and passes control to a decision block 1440. The decision block 1440 determines whether or not the current value of the syntax element pseudo_view_present_flag is equal to true. If so, then control is passed to a function block 1445. Otherwise, control is passed to an end block 1499.

The function block 1445 sets the following syntax elements, and passes control to a function block 1450: tiling_mode; org_pic_width_in_mbs_minus1; and org_pic_height_in_mbs_minus1. The function block 1450 calls a syntax element pseudo_view_info(view_id) for each coded view, and passes control to the end block 1499.

Figure 15B:
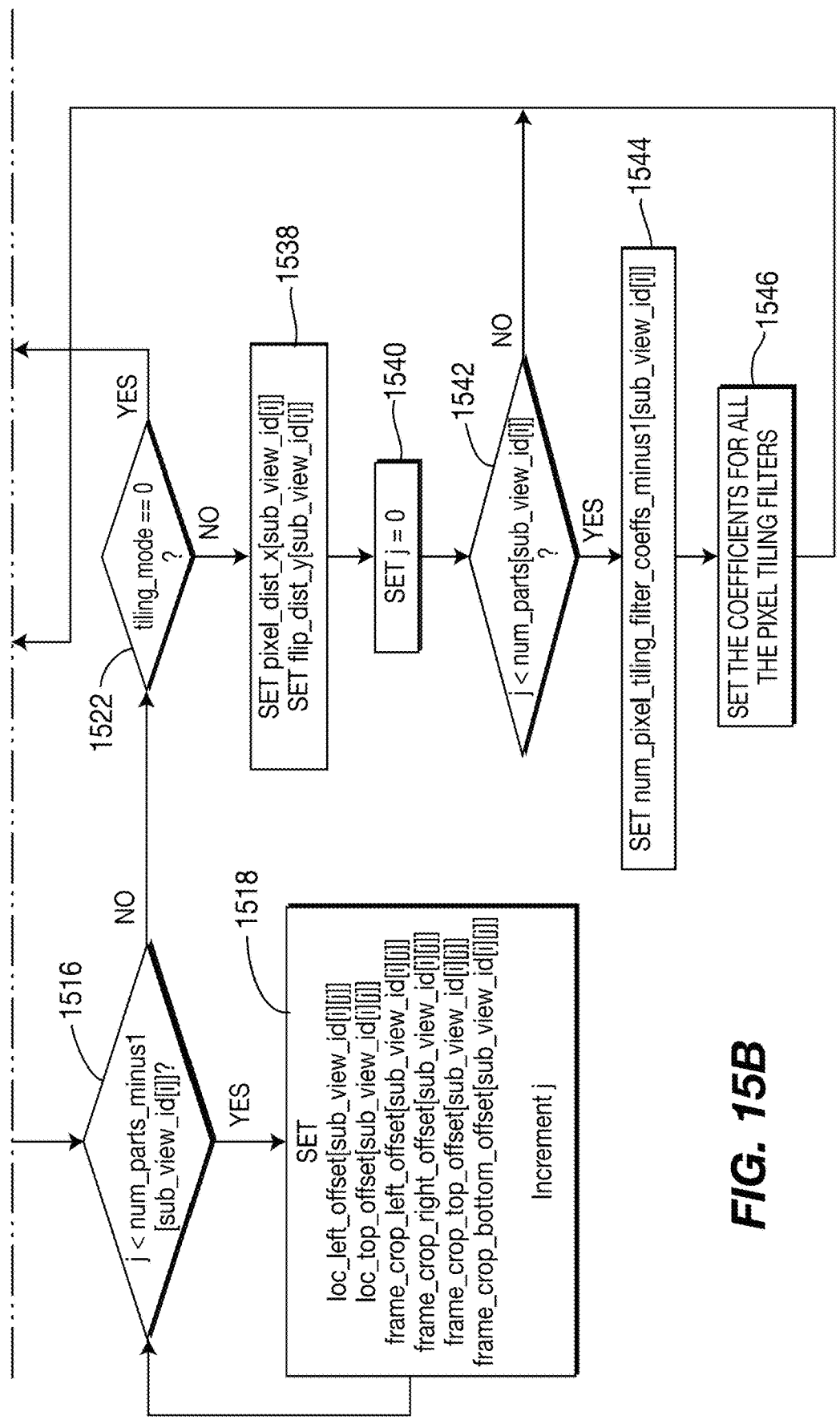

Turning to FIG. 15, including FIGS. 15A and 15B, an exemplary method for encoding pictures for a plurality of views using the multi-view video coding (MVC) extension of the MPEG-4 AVC Standard is indicated generally by the reference numeral 1500.

The method 1500 includes a start block 1502 that has an input parameter pseudo_view_id and passes control to a function block 1504. The function block 1504 sets a syntax element num_sub_views_minus1, and passes control to a function block 1506. The function block 1506 sets a variable i equal to zero, and passes control to a decision block 1508. The decision block 1508 determines whether or not the variable i is less than the number of sub_views. If so, then control is passed to a function block 1510. Otherwise, control is passed to a function block 1520.

The function block 1510 sets a syntax element sub_view_id[i], and passes control to a function block 1512. The function block 1512 sets a syntax element num_parts_minus1[sub_view_id[i]], and passes control to a function block 1514. The function block 1514 sets a variable j equal to zero, and passes control to a decision block 1516. The decision block 1516 determines whether or not the variable j is less than the syntax element num_parts_minus1 [sub_view_id[i]]. If so, then control is passed to a function block 1518. Otherwise, control is passed to a decision block 1522.

The function block 1518 sets the following syntax elements, increments the variable j, and returns control to the decision block 1516: loc_left_offset[sub_view_id[i]][j]; loc_top_offset[sub_view_id[i]][j]; frame_crop_left_offset [sub_view_id[i]][j]; frame_crop_right_offset[sub_view_id[i]][j]; frame_crop_top_offset[sub_view_id[i]][j]; and frame_crop_bottom_offset[sub_view_id[i]][j].

The function block 1520 encodes the current picture for the current view using multi-view video coding (MVC), and passes control to an end block 1599.

The decision block 1522 determines whether or not a syntax element tiling_mode is equal to zero. If so, then control is passed to a function block 1524. Otherwise, control is passed to a function block 1538.

The function block 1524 sets a syntax element flip_dir [sub_view_id[i]] and a syntax element upsample_view_flag [sub_view_id[i]], and passes control to a decision block 1526. The decision block 1526 determines whether or not the current value of the syntax element upsample_view_flag [sub_view_id[i]] is equal to one. If so, then control is passed to a function block 1528. Otherwise, control is passed to a decision block 1530.

The function block 1528 sets a syntax element upsample_filter[sub_view_id[i]], and passes control to the decision block 1530. The decision block 1530 determines whether or not a value of the syntax element upsample_filter[sub_view_id[i]] is equal to three. If so, the control is passed to a function block 1532. Otherwise, control is passed to a function block 1536.

The function block 1532 sets the following syntax elements, and passes control to a function block 1534: vert_dim

[sub_view_id[i]]; hor_dim[sub_view_id[i]]; and quantizer [sub_view_id[i]]. The function block 1534 sets the filter coefficients for each YUV component, and passes control to the function block 1536.

The function block 1536 increments the variable i, and returns control to the decision block 1508.

The function block 1538 sets a syntax element pixel_dist_x[sub_view_id[i]] and the syntax element flip_dist_y [sub_view_id[i]], and passes control to a function block 1540. The function block 1540 sets the variable j equal to zero, and passes control to a decision block 1542. The decision block 1542 determines whether or not the current value of the variable j is less than the current value of the syntax element num_parts[sub_view_id[i]]. If so, then control is passed to a function block 1544. Otherwise, control is passed to the function block 1536.

The function block 1544 sets a syntax element num_pixel_tiling_filter_coeffs_minus1[sub_view_id[i]], and passes control to a function block 1546. The function block 1546 sets the coefficients for all the pixel tiling filters, and passes control to the function block 1536.

Figure 16:
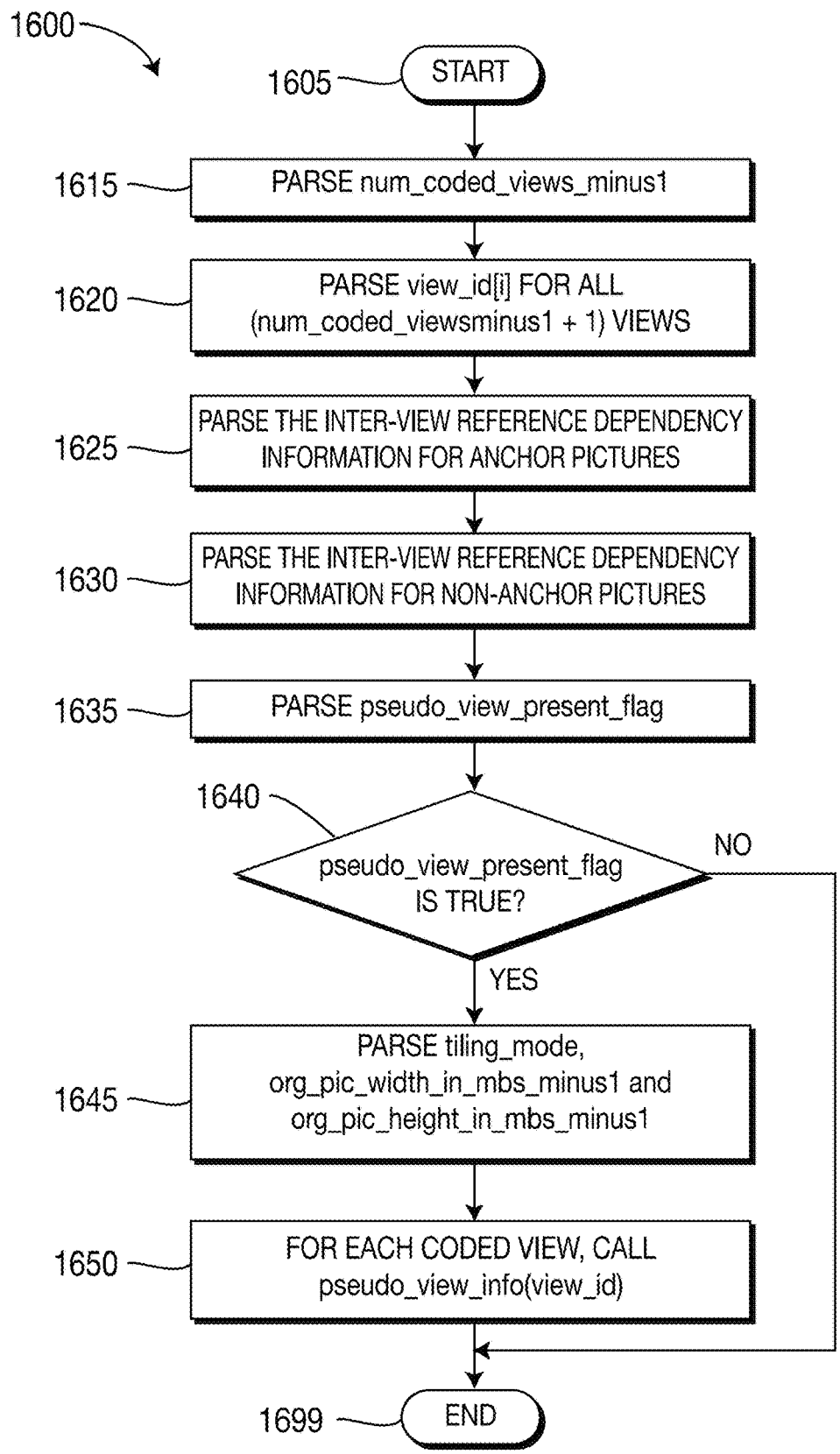
FIG. 16 is a flow diagram for a method for processing pictures for a plurality of views in preparation for decoding the pictures using the multi-view video coding (MVC) extension of the MPEG-4 AVC Standard, in accordance with an embodiment of the present principles.

Turning to FIG. 16, an exemplary method for processing pictures for a plurality of views in preparation for decoding the pictures using the multi-view video coding (MVC) extension of the MPEG-4 AVC Standard is indicated generally by the reference numeral 1600.

The method 1600 includes a start block 1605 that passes control to a function block 1615. The function block 1615 parses a syntax element num_coded_views_minus1, and passes control to a function block 1620. The function block 1620 parses a syntax element view_id[i] for all (num_coded_views_minus1+1) views, and passes control to a function block 1625. The function block 1625 parses the inter-view reference dependency information for anchor pictures, and passes control to a function block 1630. The function block 1630 parses the inter-view reference dependency information for non-anchor pictures, and passes control to a function block 1635. The function block 1635 parses a syntax element pseudo_view_present_flag, and passes control to a decision block 1640. The decision block 1640 determines whether or not the current value of the syntax element pseudo_view_present_flag is equal to true. If so, then control is passed to a function block 1645. Otherwise, control is passed to an end block 1699.

The function block 1645 parses the following syntax elements, and passes control to a function block 1650: tiling_mode; org_pic_width_in_mbs_minus1; and org_pic_height_in_mbs_minus1. The function block 1650 calls a syntax element pseudo_view_info(view_id) for each coded view, and passes control to the end block 1699.

Figure 17B:
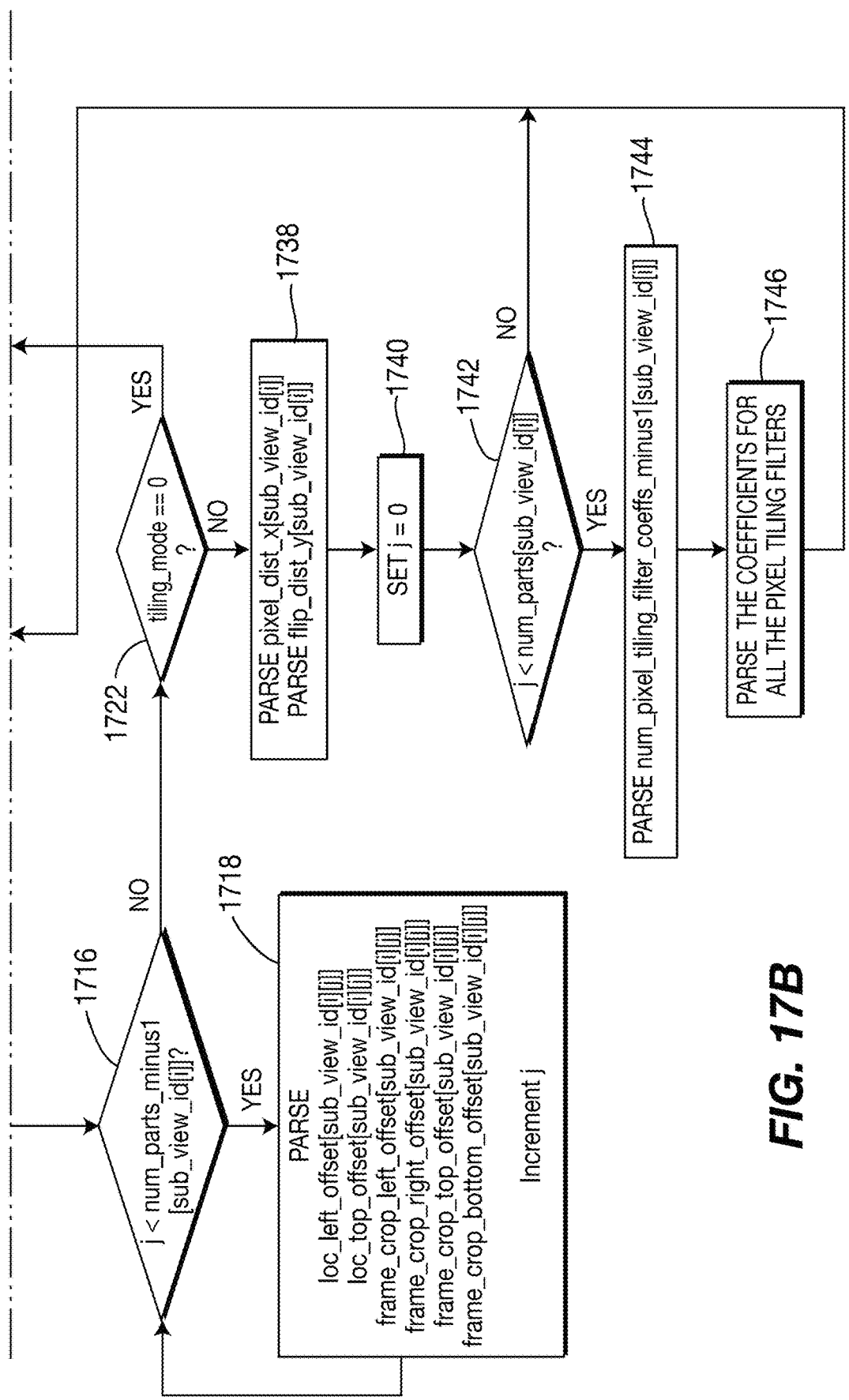

Turning to FIG. 17, including FIGS. 17A and 17B, an exemplary method for decoding pictures for a plurality of views using the multi-view video coding (MVC) extension of the MPEG-4 AVC Standard is indicated generally by the reference numeral 1700.

The method 1700 includes a start block 1702 that starts with input parameter pseudo_view_id and passes control to a function block 1704. The function block 1704 parses a syntax element num_sub_views_minus1, and passes control to a function block 1706. The function block 1706 sets a variable i equal to zero, and passes control to a decision block 1708. The decision block 1708 determines whether or not the variable i is less than the number of sub_views. If so, then control is passed to a function block 1710. Otherwise, control is passed to a function block 1720.

The function block 1710 parses a syntax element sub_view_id[i], and passes control to a function block 1712. The function block 1712 parses a syntax element num_parts_minus1[sub_view_id[i]], and passes control to a function block 1714. The function block 1714 sets a variable j equal to zero, and passes control to a decision block 1716. The decision block 1716 determines whether or not the variable j is less than the syntax element num_parts_minus1 [sub_view_id [i]]. If so, then control is passed to a function block 1718. Otherwise, control is passed to a decision block 1722.

The function block 1718 sets the following syntax elements, increments the variable j, and returns control to the decision block 1716: loc_left_offset[sub_view_id[i]][j]; loc_top_offset[sub_view_id[i]][j]; frame_crop_left_offset [sub_view_id[i]][j]; frame_crop_right_offset[sub_view_id [i]][j]; frame_crop_top_offset[sub_view_id[i]][j]; and frame_crop_bottom_offset[sub_view_id[i]][j].

The function block 1720 decodes the current picture for the current view using multi-view video coding (MVC), and passes control to a function block 1721. The function block 1721 separates each view from the picture using the high level syntax, and passes control to an end block 1799.

The separation of each view from the decoded picture is done using the high level syntax indicated in the bitstream. This high level syntax may indicate the exact location and possible orientation of the views (and possible corresponding depth) present in the picture.

The decision block 1722 determines whether or not a syntax element tiling_mode is equal to zero. If so, then control is passed to a function block 1724. Otherwise, control is passed to a function block 1738.

The function block 1724 parses a syntax element flip_dir [sub_view_id[i]] and a syntax element upsample_view_flag [sub_view_id[i]], and passes control to a decision block 1726. The decision block 1726 determines whether or not the current value of the syntax element upsample_view_flag [sub_view_id[i]] is equal to one. If so, then control is passed to a function block 1728. Otherwise, control is passed to a decision block 1730.

The function block 1728 parses a syntax element upsample_filter[sub_view_id[i]], and passes control to the decision block 1730. The decision block 1730 determines whether or not a value of the syntax element upsample_filter[sub_view_id[i]] is equal to three. If so, the control is passed to a function block 1732. Otherwise, control is passed to a function block 1736.

The function block 1732 parses the following syntax elements, and passes control to a function block 1734: vert_dim[sub_view_id[i]]; hor_dim[sub_view_id[i]]; and quantizer[sub_view_id[i]]. The function block 1734 parses the filter coefficients for each YUV component, and passes control to the function block 1736.

The function block 1736 increments the variable i, and returns control to the decision block 1708.

The function block 1738 parses a syntax element pixel_dist_x[sub_view_id[i]] and the syntax element flip_dist_y [sub_view_id[i]], and passes control to a function block 1740. The function block 1740 sets the variable j equal to zero, and passes control to a decision block 1742. The decision block 1742 determines whether or not the current value of the variable j is less than the current value of the syntax element num_parts[sub_view_id[i]]. If so, then control is passed to a function block 1744. Otherwise, control is passed to the function block 1736.

The function block 1744 parses a syntax element num_pixel_tiling_filter_coeffs_minus1[sub_view_id[i]], and passes control to a function block 1746. The function block 1776 parses the coefficients for all the pixel tiling filters, and passes control to the function block 1736.

Figure 18:
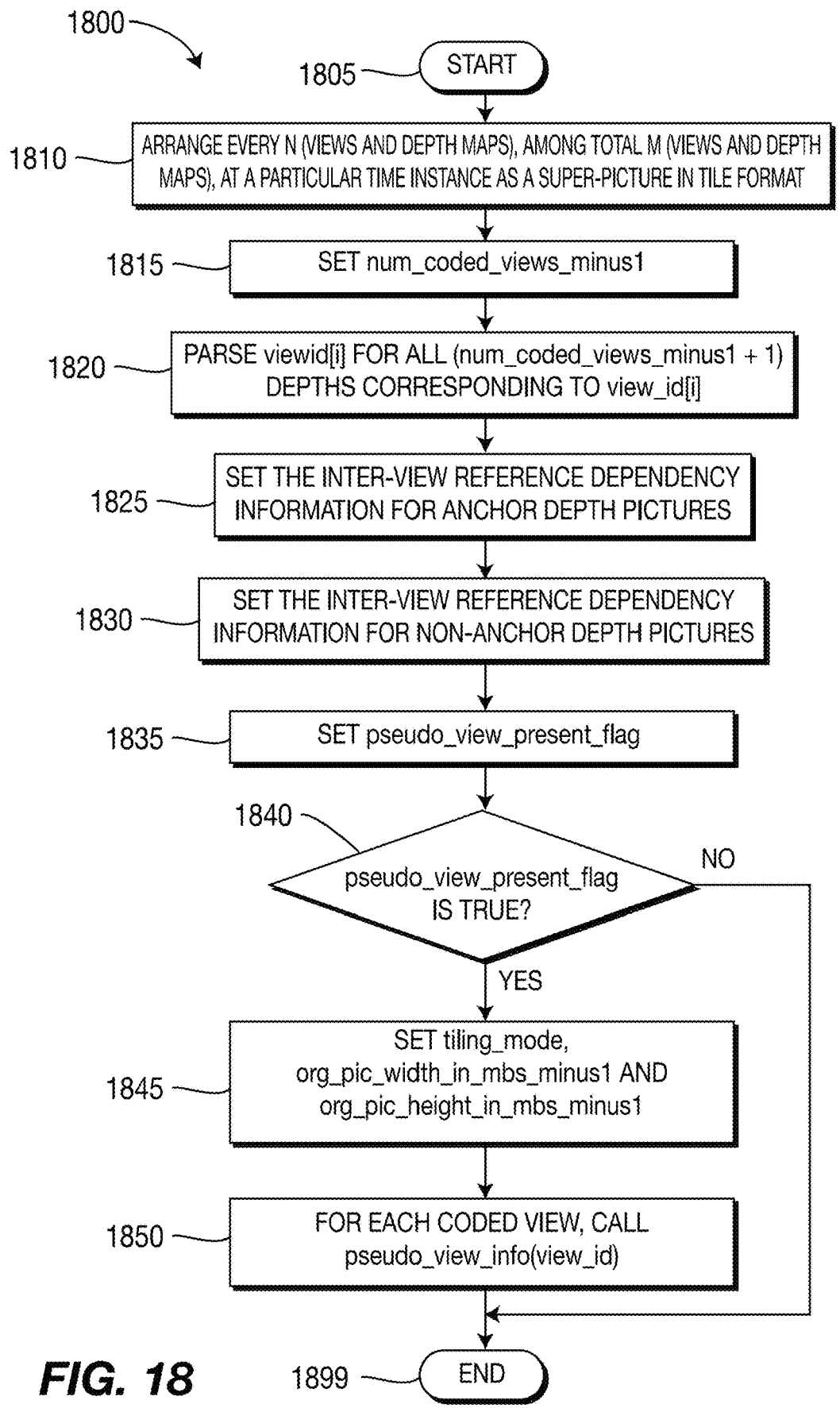
FIG. 18 is a flow diagram for a method for processing pictures for a plurality of views and depths in preparation for encoding the pictures using the multi-view video coding (MVC) extension of the MPEG-4 AVC Standard, in accordance with an embodiment of the present principles.

Turning to FIG. 18, an exemplary method for processing pictures for a plurality of views and depths in preparation for encoding the pictures using the multi-view video coding (MVC) extension of the MPEG-4 AVC Standard is indicated generally by the reference numeral 1800.

The method 1800 includes a start block 1805 that passes control to a function block 1810. The function block 1810 arranges every N views and depth maps, among a total of M views and depth maps, at a particular time instance as a super-picture in tile format, and passes control to a function block 1815. The function block 1815 sets a syntax element num_coded_views_minus1, and passes control to a function block 1820. The function block 1820 sets a syntax element view_id[i] for all (num_coded_views_minus1+1) depths corresponding to view_id[i], and passes control to a function block 1825. The function block 1825 sets the inter-view reference dependency information for anchor depth pictures, and passes control to a function block 1830. The function block 1830 sets the inter-view reference dependency information for non-anchor depth pictures, and passes control to a function block 1835. The function block 1835 sets a syntax element pseudo_view_present_flag, and passes control to a decision block 1840. The decision block 1840 determines whether or not the current value of the syntax element pseudo_view_present_flag is equal to true. If so, then control is passed to a function block 1845. Otherwise, control is passed to an end block 1899.

The function block 1845 sets the following syntax elements, and passes control to a function block 1850: tiling_mode; org_pic_width_in_mbs_minus1; and org_pic_height_in_mbs_minus1. The function block 1850 calls a syntax element pseudo_view_info(view_id) for each coded view, and passes control to the end block 1899.

Figure 19B:
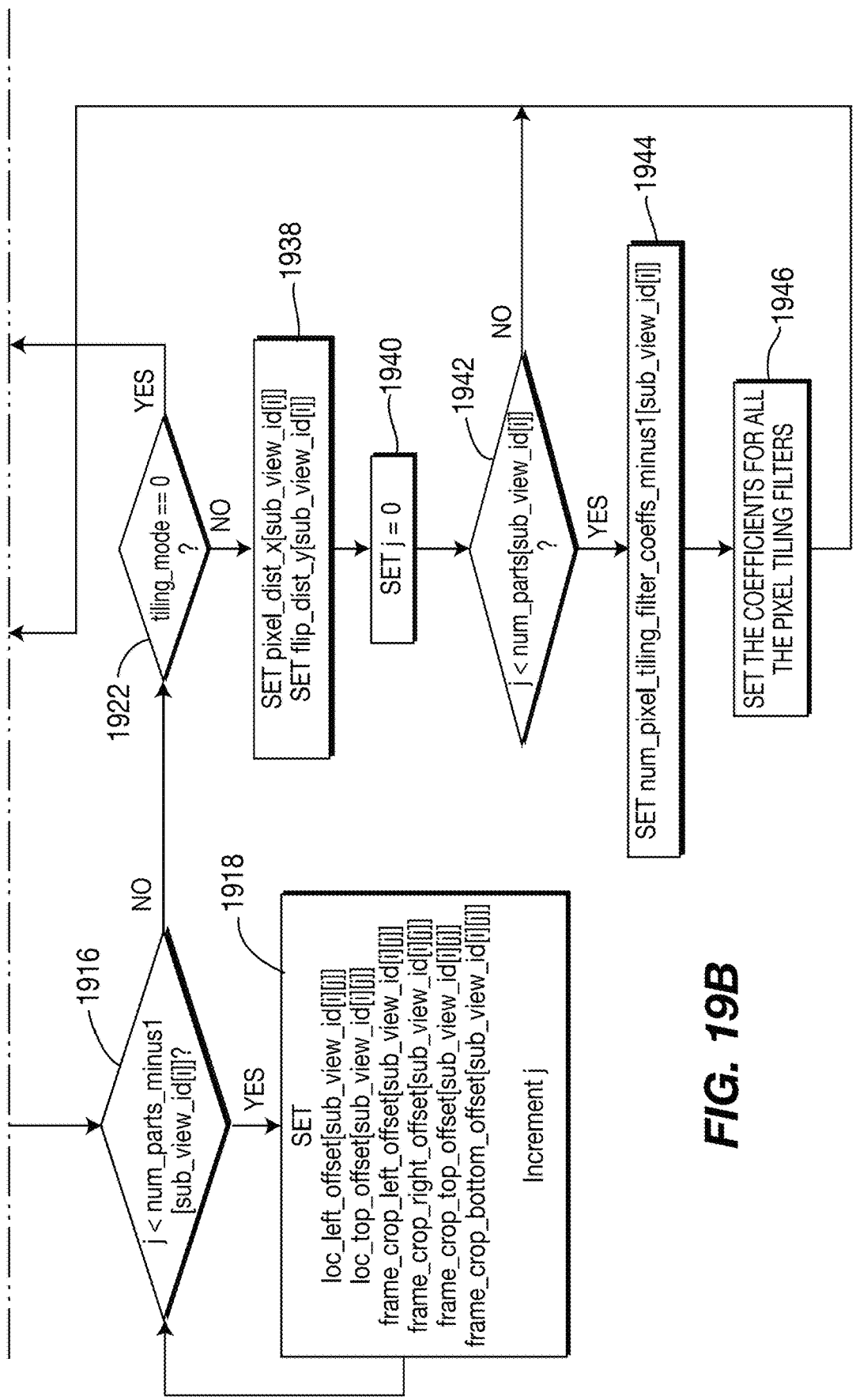

Turning to FIG. 19, including FIGS. 19A and 19B, an exemplary method for encoding pictures for a plurality of views and depths using the multi-view video coding (MVC) extension of the MPEG-4 AVC Standard is indicated generally by the reference numeral 1900.

The method 1900 includes a start block 1902 that passes control to a function block 1904. The function block 1904 sets a syntax element num_sub_views_minus1, and passes control to a function block 1906. The function block 1906 sets a variable i equal to zero, and passes control to a decision block 1908. The decision block 1908 determines whether or not the variable i is less than the number of sub_views. If so, then control is passed to a function block 1910. Otherwise, control is passed to a function block 1920.

The function block 1910 sets a syntax element sub_view_id[i], and passes control to a function block 1912. The function block 1912 sets a syntax element num_parts_minus1[sub_view_id[i]], and passes control to a function block 1914. The function block 1914 sets a variable j equal to zero, and passes control to a decision block 1916. The decision block 1916 determines whether or not the variable j is less than the syntax element num_parts_minus1 [sub_view_id[i]]. If so, then control is passed to a function block 1918. Otherwise, control is passed to a decision block 1922.

The function block 1918 sets the following syntax elements, increments the variable j, and returns control to the decision block 1916: loc_left_offset[sub_view_id[i]][j]; loc_top_offset[sub_view_id[i]][j]; frame_crop_left_offset [sub_view_id[i]][j]; frame_crop_right_offset[sub_view_id [i]][j]; frame_crop_top_offset[sub_view_id[i]][j]; and frame_crop_bottom_offset[sub_view_id[i]][j].

The function block 1920 encodes the current depth for the current view using multi-view video coding (MVC), and passes control to an end block 1999. The depth signal may be encoded similar to the way its corresponding video signal is encoded. For example, the depth signal for a view may be included on a tile that includes only other depth signals, or only video signals, or both depth and video signals. The tile (pseudo-view) is then treated as a single view for MVC, and there are also presumably other tiles that are treated as other views for MVC.

The decision block 1922 determines whether or not a syntax element tiling_mode is equal to zero. If so, then control is passed to a function block 1924. Otherwise, control is passed to a function block 1938.

The function block 1924 sets a syntax element flip_dir [sub_view_id[i]] and a syntax element upsample_view_flag [sub_view_id[i]], and passes control to a decision block 1926. The decision block 1926 determines whether or not the current value of the syntax element upsample_view_flag [sub_view_id[i]] is equal to one. If so, then control is passed to a function block 1928. Otherwise, control is passed to a decision block 1930.

The function block 1928 sets a syntax element upsample_filter[sub_view_id[i]], and passes control to the decision block 1930. The decision block 1930 determines whether or not a value of the syntax element upsample_filter[sub_view_id[i]] is equal to three. If so, the control is passed to a function block 1932. Otherwise, control is passed to a function block 1936.

The function block 1932 sets the following syntax elements, and passes control to a function block 1934: vert_dim [sub_view_id[i]]; hor_dim[sub_view_id[i]]; and quantizer [sub_view_id[i]]. The function block 1934 sets the filter coefficients for each YUV component, and passes control to the function block 1936.

The function block 1936 increments the variable i, and returns control to the decision block 1908.

The function block 1938 sets a syntax element pixel_dist_x[sub_view_id[i]] and the syntax element flip_dist_y [sub_view_id[i]], and passes control to a function block 1940. The function block 1940 sets the variable j equal to zero, and passes control to a decision block 1942. The decision block 1942 determines whether or not the current value of the variable j is less than the current value of the syntax element num_parts[sub_view_id[i]]. If so, then control is passed to a function block 1944. Otherwise, control is passed to the function block 1936.

The function block 1944 sets a syntax element num_pixel_tiling_filter_coeffs_minus1[sub_view_id[i]], and passes control to a function block 1946. The function block 1946 sets the coefficients for all the pixel tiling filters, and passes control to the function block 1936.

Figure 20:
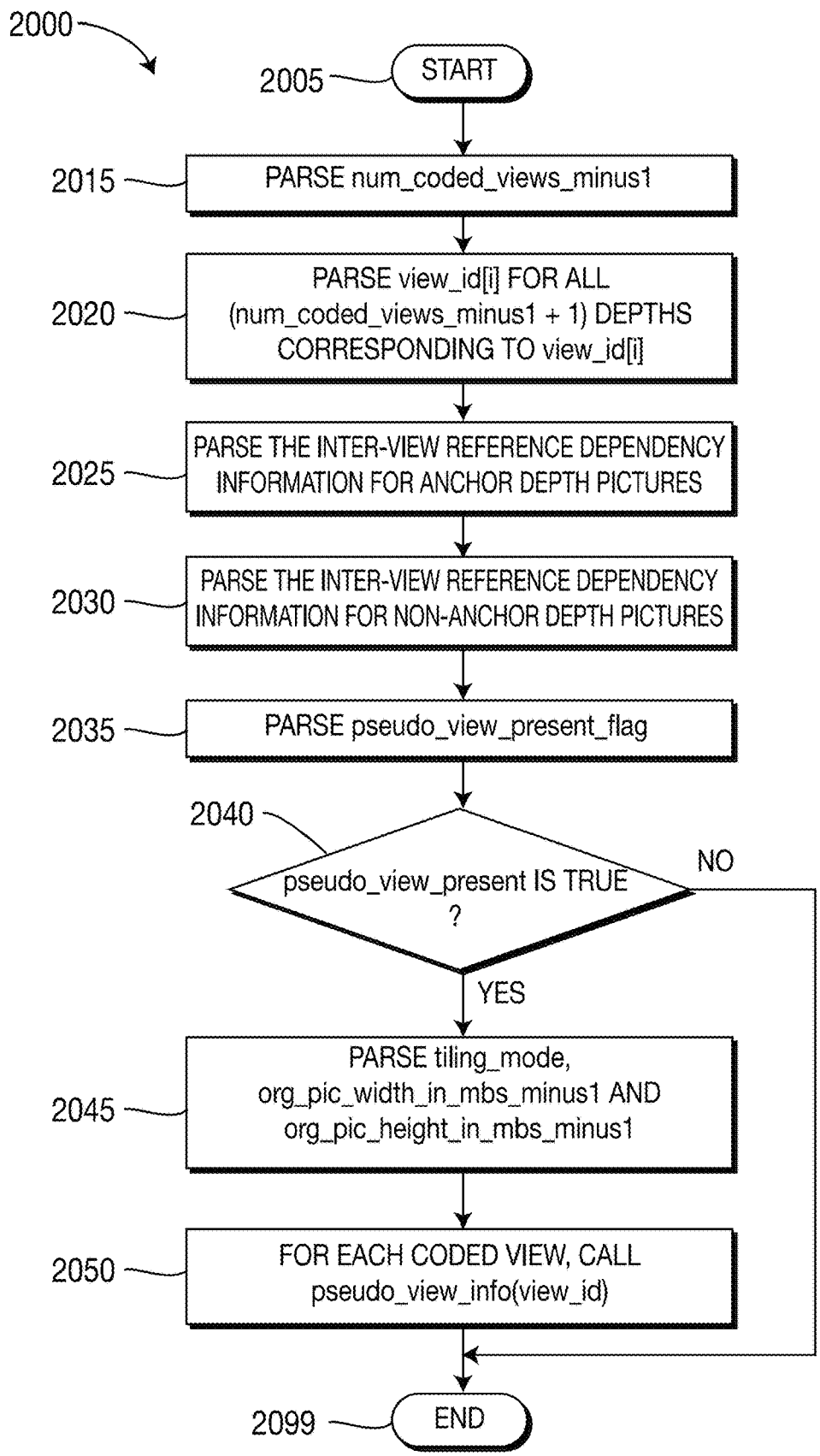
FIG. 20 is a flow diagram for a method for processing pictures for a plurality of views and depths in preparation for decoding the pictures using the multi-view video coding (MVC) extension of the MPEG-4 AVC Standard, in accordance with an embodiment of the present principles.

Turning to FIG. 20, an exemplary method for processing pictures for a plurality of views and depths in preparation for decoding the pictures using the multi-view video coding (MVC) extension of the MPEG-4 AVC Standard is indicated generally by the reference numeral 2000.

The method 2000 includes a start block 2005 that passes control to a function block 2015. The function block 2015 parses a syntax element num_coded_views_minus1, and passes control to a function block 2020. The function block 2020 parses a syntax element view_id[i] for all (num_coded_views_minus1+1) depths corresponding to view_id[i], and passes control to a function block 2025. The function block 2025 parses the inter-view reference dependency information for anchor depth pictures, and passes control to a function block 2030. The function block 2030 parses the inter-view reference dependency information for non-anchor depth pictures, and passes control to a function block 2035. The function block 2035 parses a syntax element pseudo_view_present_flag, and passes control to a decision block 2040. The decision block 2040 determines whether or not the current value of the syntax element pseudo_view_present_flag is equal to true. If so, then control is passed to a function block 2045. Otherwise, control is passed to an end block 2099.

The function block 2045 parses the following syntax elements, and passes control to a function block 2050: tiling_mode; org_pic_width_in_mbs_minus1; and org_pic_height_in_mbs_minus1. The function block 2050 calls a syntax element pseudo_view_info(view_id) for each coded view, and passes control to the end block 2099.

Figure 21B:
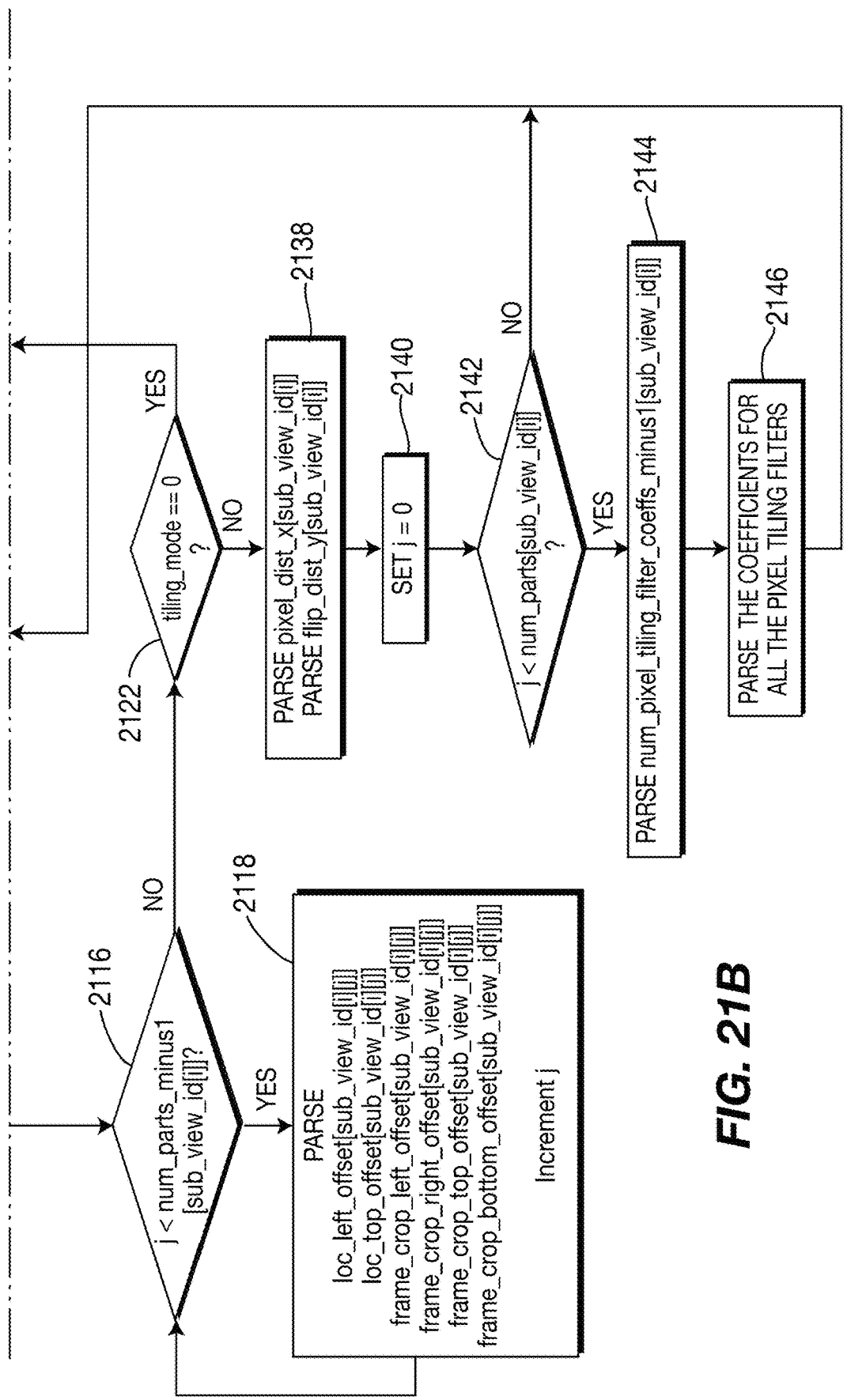

Turning to FIG. 21, including FIGS. 21A and 21B, an exemplary method for decoding pictures for a plurality of views and depths using the multi-view video coding (MVC) extension of the MPEG-4 AVC Standard is indicated generally by the reference numeral 2100.

The method 2100 includes a start block 2102 that starts with input parameter pseudo_view_id, and passes control to a function block 2104. The function block 2104 parses a syntax element num_sub_views_minus1, and passes control to a function block 2106. The function block 2106 sets a variable i equal to zero, and passes control to a decision block 2108. The decision block 2108 determines whether or not the variable i is less than the number of sub_views. If so, then control is passed to a function block 2110. Otherwise, control is passed to a function block 2120.

The function block 2110 parses a syntax element sub_view_id[i], and passes control to a function block 2112. The function block 2112 parses a syntax element num_parts_minus1[sub_view_id[i]], and passes control to a function block 2114. The function block 2114 sets a variable j equal to zero, and passes control to a decision block 2116. The decision block 2116 determines whether or not the variable j is less than the syntax element num_parts_minus1 [sub_view_id[i]]. If so, then control is passed to a function block 2118. Otherwise, control is passed to a decision block 2122.

The function block 2118 sets the following syntax elements, increments the variable j, and returns control to the decision block 2116: loc_left_offset[sub_view_id[i]][j]; loc_top_offset[sub_view_id[i]][j]; frame_crop_left_offset [sub_view_id[i]][j]; frame_crop_right_offset[sub_view_id [i]][j]; frame_crop_top_offset[sub_view_id[i]][j]; and frame_crop_bottom_offset[sub_view_id[i]][j].

The function block 2120 decodes the current picture using multi-view video coding (MVC), and passes control to a function block 2121. The function block 2121 separates each view from the picture using the high level syntax, and passes control to an end block 2199. The separation of each view using high level syntax is as previously described.

The decision block 2122 determines whether or not a syntax element tiling_mode is equal to zero. If so, then control is passed to a function block 2124. Otherwise, control is passed to a function block 2138.

The function block 2124 parses a syntax element flip_dir [sub_view_id[i]] and a syntax element upsample_view_flag [sub_view_id[i]], and passes control to a decision block 2126. The decision block 2126 determines whether or not the current value of the syntax element upsample_view_flag [sub_view_id[i]] is equal to one. If so, then control is passed to a function block 2128. Otherwise, control is passed to a decision block 2130.

The function block 2128 parses a syntax element upsample_filter[sub_view_id[i]], and passes control to the decision block 2130. The decision block 2130 determines whether or not a value of the syntax element upsample_filter[sub_view_id[i]] is equal to three. If so, the control is passed to a function block 2132. Otherwise, control is passed to a function block 2136.

The function block 2132 parses the following syntax elements, and passes control to a function block 2134: vert_dim[sub_view_id[i]]; hor_dim[sub_view_id[i]]; and quantizer[sub_view_id[i]]. The function block 2134 parses the filter coefficients for each YUV component, and passes control to the function block 2136.

The function block 2136 increments the variable i, and returns control to the decision block 2108.

The function block 2138 parses a syntax element pixel_dist_x[sub_view_id[i]] and the syntax element flip_dist_y [sub_view_id[i]], and passes control to a function block 2140. The function block 2140 sets the variable j equal to zero, and passes control to a decision block 2142. The decision block 2142 determines whether or not the current value of the variable j is less than the current value of the syntax element num_parts[sub_view_id[i]]. If so, then control is passed to a function block 2144. Otherwise, control is passed to the function block 2136.

The function block 2144 parses a syntax element num_pixel_tiling_filter_coeffs_minus1[sub_view_id[i]], and passes control to a function block 2146. The function block 2146 parses the coefficients for all the pixel tiling filters, and passes control to the function block 2136.

Figure 22:
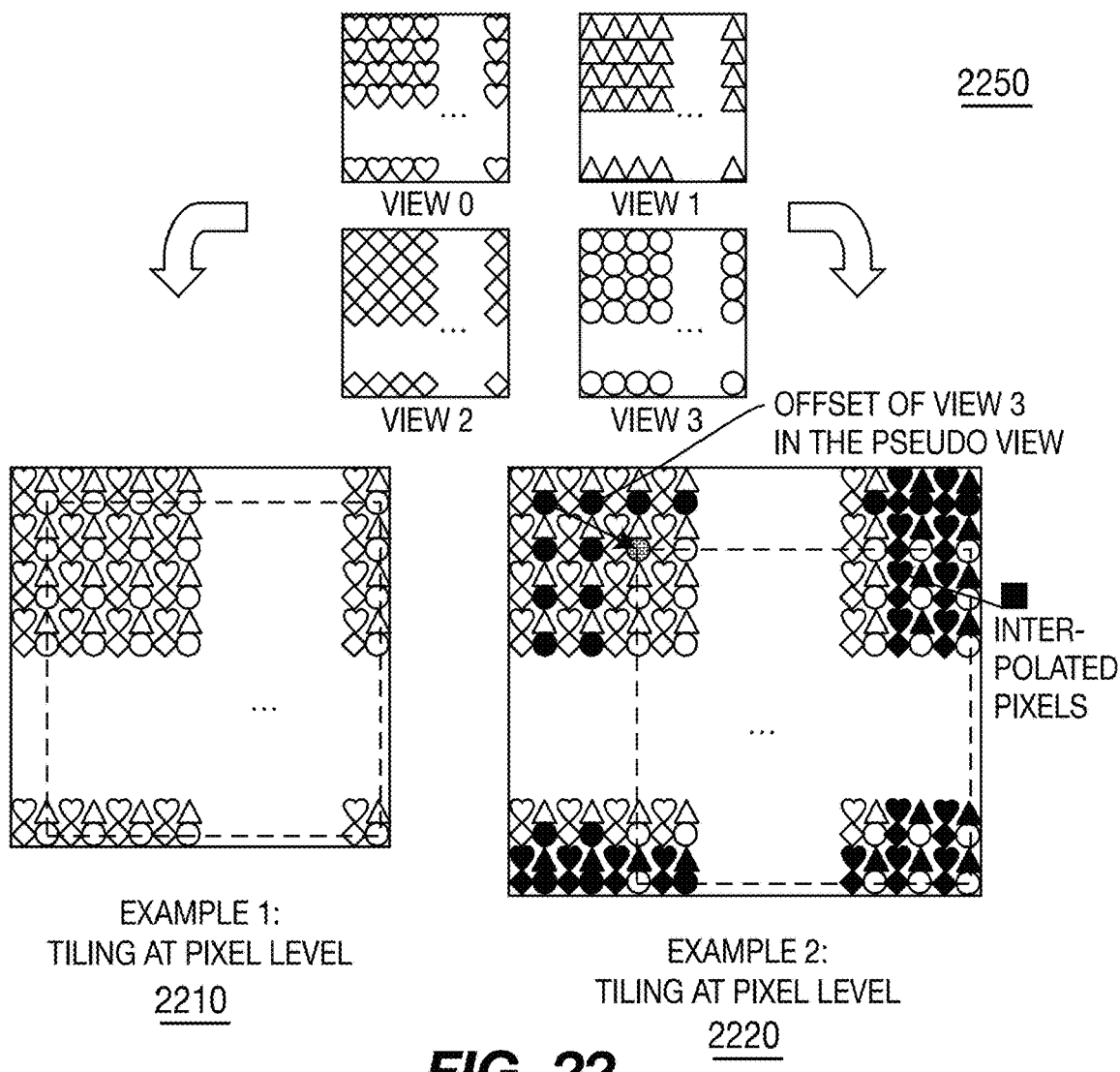
FIG. 22 is a diagram showing tiling examples at the pixel level, in accordance with an embodiment of the present principles.

Turning to FIG. 22, tiling examples at the pixel level are indicated generally by the reference numeral 2200. FIG. 22 is described further below.

View Tiling Using Mpeg-4 AVC or MVC

An application of multi-view video coding is free view point TV (or FTV). This application requires that the user can freely move between two or more views. In order to accomplish this, the "virtual" views in between two views need to be interpolated or synthesized. There are several methods to perform view interpolation. One of the methods uses depth for view interpolation/synthesis.

Each view can have an associated depth signal. Thus, the depth can be considered to be another form of video signal. FIG. 9 shows an example of a depth signal 900. In order to enable applications such as FTV, the depth signal is transmitted along with the video signal. In the proposed framework of tiling, the depth signal can also be added as one of the tiles. FIG. 10 shows an example of depth signals added as tiles. The depth signals/tiles are shown on the right side of FIG. 10.

Once the depth is encoded as a tile of the whole frame, the high level syntax should indicate which tile is the depth signal so that the renderer can use the depth signal appropriately.

In the case when the input sequence (such as that shown in FIG. 1) is encoded using a MPEG-4 AVC Standard encoder (or an encoder corresponding to a different video coding standard and/or recommendation), the proposed high level syntax may be present in, for example, the Sequence Parameter Set (SPS), the Picture Parameter Set (PPS), a slice header, and/or a Supplemental Enhancement Information (SEI) message. An embodiment of the proposed method is shown in TABLE 1 where the syntax is present in a Supplemental Enhancement Information (SEI) message.

In the case when the input sequences of the pseudo views (such as that shown in FIG. 1) is encoded using the multi-view video coding (MVC) extension of the MPEG-4 AVC Standard encoder (or an encoder corresponding to multi-view video coding standard with respect to a different video coding standard and/or recommendation), the proposed high level syntax may be present in the SPS, the PPS, slice header, an SEI message, or a specified profile. An embodiment of the proposed method is shown in TABLE 1. TABLE 1 shows syntax elements present in the Sequence Parameter Set (SPS) structure, including syntax elements proposed in accordance with an embodiment of the present principles.

TABLE 1

| seq_parameter_set_mvc_extension( ) { | C | Descriptor |
|---|---|---|
| num_views_minus_1 | | ue(v) |
| for(i = 0; i <= num_views_minus_1; i++) | | |
|   view_id[i] | | ue(v) |
| for(i = 0; i <= num_views_minus_1; i++) { | | |
|   num_anchor_refs_l0[i] | | ue(v) |
|   for( j = 0; j < num_anchor_refs_l0[i]; j++ ) | | |
|     anchor_ref_l0[i][j] | | ue(v) |
|   num_anchor_refs_l1[i] | | ue(v) |
|   for( j = 0; j < num_anchor_refs_l1[i]; j++ ) | | |
|     anchor_ref_l1[i][j] | | ue(v) |
| } | | |

TABLE 1-continued

| seq_parameter_set_mvc_extension( ) { | C | Descriptor |
|---|---|---|
| for(i = 0; i <= num_views_minus_1; i++) { | | |
|   num_non_anchor_refs_l0[i] | | ue(v) |
|   for( j = 0; j < num_non_anchor_refs_l0[i]; j++ ) | | |
|     non_anchor_ref_l0[i][j] | | ue(v) |
|   num_non_anchor_refs_l1[i] | | ue(v) |
|   for( j = 0; j < num_non_anchor_refs_l1[i]; j++ ) | | |
|     non_anchor_ref_l1[i][j] | | ue(v) |
| } | | |
| pseudo_view_present_flag | | u(1) |
| if (pseudo_view_present_flag) { | | |
|   tiling_mode | | |
|   org_pic_width_in_mbs_minus1 | | |
|   org_pic_height_in_mbs_minus1 | | |
|   for( i = 0; i < num_views_minus_1; i++) | | |
|     pseudo_view_info(i); | | |
| } | | |
| } | | |

TABLE 2 shows syntax elements for the pseudo_view_info syntax element of TABLE 1, in accordance with an embodiment of the present principles.

TABLE 2

| pseudo_view_info (pseudo_view_id) { | C | Descriptor |
|---|---|---|
| num_sub_views_minus_1[pseudo_view_id] | 5 | ue(v) |
| if (num_sub_views_minus_1 != 0) { | | |
|   for ( i = 0; i < num_sub_views_minus_1[pseudo_view_id]; i++) { | | |
|     sub_view_id[i] | 5 | ue(v) |
|     num_parts_minus1[sub_view_id[ i ]] | 5 | ue(v) |
|     for( j = 0; j <= num_parts_minus1[sub_view_id[ i ]]; j++ ) { | | |
|       loc_left_offset[sub_view_id[ i ]] [ j ] | 5 | ue(v) |
|       loc_top_offset[sub_view_id[ i ]] [ j ] | 5 | ue(v) |
|       frame_crop_left_offset[sub_view_id[ i ]] [ j ] | 5 | ue(v) |
|       frame_crop_right_offset[sub_view_id[ i ]] [ j ] | 5 | ue(v) |
|       frame_crop_top_offset[sub_view_id[ i ]] [ j ] | 5 | ue(v) |
|       frame_crop_bottom_offset[sub_view_id[ i ]] [ j ] | 5 | ue(v) |
|     } | | |
|     if (tiling_mode == 0) { | | |
|       flip_dir[sub_view_id[ i ][ j ] | 5 | u(2) |
|       upsample_view_flag[sub_view_id[ i ]] | 5 | u(1) |
|       if(upsample_view_flag[sub_view_id[ i ]]) | | |
|         upsample_filter[sub_view_id[ i ]] | 5 | u(2) |
|       if(upsample_fiter[sub_view_id[i]] == 3) { | | |
|         vert_dim[sub_view_id[i]] | 5 | ue(v) |
|         hor_dim[sub_view_id[i]] | 5 | ue(v) |
|         quantizer[sub_view_id[i]] | 5 | ue(v) |
|         for (yuv= 0; yuv< 3; yuv++) { | | |
|           for (y = 0; y < vert_dim[sub_view_id[i]] − 1; y ++) { | | |
|             for (x = 0; x < hor_dim[sub_view_id[i]] − 1; x ++) | | |
|               filter_coeffs[sub_view_id[i]] [yuv][y][x] | 5 | se(v) |
|           } | | |
|         } | | |
|       } | | |
|     } // if(tiling_mode == 0) | | |
|     else if (tiling_mode == 1) { | | |
|       pixel_dist_x[sub_view_id[ i ] ] | | |
|       pixel_dist_y[sub_view_id[ i ] ] | | |
|       for( j = 0; j <= num_parts[sub_view_id[ i ]]; j++ ) { | | |
|         num_pixel_tiling_filter_coeffs_minus1[sub_view_id[ i ] ][j] | | |
|         for (coeff_idx = 0; coeff_idx <= num_pixel_tiling_filter_coeffs_minus1[sub_view_id[ i ] ][j]; j++) | | |
|           pixel_tiling_filter_coeffs[sub_view_id[i]][j] | | |
|       } // for ( j = 0; j <= num_parts[sub_view_id[ i ]]; j++ ) | | |
|     } // else if (tiling_mode == 1) | | |
|   } // for ( i = 0; i < num_sub_views_minus_1; i++) | | |
| } // if (num_sub_views_minus_1 != 0) | | |
| } | | |

Semantics of the Syntax Elements Presented in TABLE 1 and TABLE 2 pseudo_view_present_flag equal to true indicates that some view is a super view of multiple sub-views.

tiling_mode equal to 0 indicates that the sub-views are tiled at the picture level. A value of 1 indicates that the tiling is done at the pixel level.

The new SEI message could use a value for the SEI payload type that has not been used in the MPEG-4 AVC Standard or an extension of the MPEG-4 AVC Standard. The new SEI message includes several syntax elements with the following semantics.

num_coded_views_minus1 plus 1 indicates the number of coded views supported by the bitstream. The value of num_coded_views_minus1 is in the scope of 0 to 1023, inclusive.

org_pic_width_in_mbs_minus1 plus 1 specifies the width of a picture in each view in units of macroblocks.

The variable for the picture width in units of macroblocks is derived as follows:

$$PicWidthInMbs = org\_pic\_width\_in\_mbs\_minus1 + 1$$

The variable for picture width for the luma component is derived as follows:

$$PicWidthInSamplesL = PicWidthInMbs*16$$

The variable for picture width for the chroma components is derived as follows:

$$PicWidthInSamplesC = PicWidthInMbs*MbWidthC$$

org_pic_height_in_mbs_minus1 plus 1 specifies the height of a picture in each view in units of macroblocks.

The variable for the picture height in units of macroblocks is derived as follows:

$$PicHeightInMbs = org\_pic\_height\_in\_mbs\_minus1 + 1$$

The variable for picture height for the luma component is derived as follows:

$$PicHeightInSamplesL = PicHeightInMbs*16$$

The variable for picture height for the chroma components is derived as follows:

$$PicHeightInSamplesC = PicHeightInMbs*MbHeightC$$

num_sub_views_minus1 plus 1 indicates the number of coded sub-views included in the current view. The value of num_coded_views_minus1 is in the scope of 0 to 1023, inclusive.

sub_view_id[i] specifies the sub_view_id of the sub-view with decoding order indicated by i.

num_parts[sub_view_id[i]] specifies the number of parts that the picture of sub_view_id[i] is split up into.

loc_left_offset[sub_view_id[i]][j] and loc_top_offset[sub_view_id[i]][j] specify the locations in left and top pixels offsets, respectively, where the current part j is located in the final reconstructed picture of the view with sub_view_id equal to sub_view_id[i].

view_id[i] specifies the view_id of the view with coding order indicate by i.

frame_crop_left_offset[view_id[i]][j], frame_crop_right_offset[view_id[i]][j], frame_crop_top_offset[view_id[i]][j], and frame_crop_bottom_offset[view_id[i]][j] specify the samples of the pictures in the coded video sequence that are part of num_part j and view_id i, in terms of a rectangular region specified in frame coordinates for output.

The variables CropUnitX and CropUnitY are derived as follows:
  If chroma_format_idc is equal to 0, CropUnitX and CropUnitY are derived as follows:

$$CropUnitX = 1$$

$$CropUnitY = 2 - frame\_mbs\_only\_flag$$

Otherwise (chroma_format_idc is equal to 1, 2, or 3), CropUnitX and CropUnitY are derived as follows:

$$CropUnitX = SubWidthC$$

$$CropUnitY = SubHeightC*(2 - frame\_mbs\_only\_flag)$$

The frame cropping rectangle includes luma samples with horizontal frame coordinates from the following:

CropUnitX*frame_crop_left_offset to PicWidthInSamplesL—(CropUnitX*frame_crop_right_offset+1) and vertical frame coordinates from CropUnitY* frame_crop_top_offset to (16*FrameHeightInMbs)—(CropUnitY*frame_crop_bottom_offset+1), inclusive. The value of frame_crop_left_offset shall be in the range of 0 to (PicWidthInSamplesL/CropUnitX)—(frame_crop_right_offset+1), inclusive; and the value of frame_crop_top_offset shall be in the range of 0 to (16*FrameHeightInMbs/CropUnitY)—(frame_crop_bottom_offset+1), inclusive.

When chroma_format_idc is not equal to 0, the corresponding specified samples of the two chroma arrays are the samples having frame coordinates (x/SubWidthC, y/SubHeightC), where (x, y) are the frame coordinates of the specified luma samples.

For decoded fields, the specified samples of the decoded field are the samples that fall within the rectangle specified in frame coordinates.

num_parts[view_id[i]] specifies the number of parts that the picture of view_id[i] is split up into.

depth_flag[view_id[i]] specifies whether or not the current part is a depth signal. If depth_flag is equal to 0, then the current part is not a depth signal. If depth_flag is equal to 1, then the current part is a depth signal associated with the view identified by view_id[i].

flip_dir[sub_view_id[i]][j] specifies the flipping direction for the current part. flip_dir equal to 0 indicates no flipping, flip_dir equal to 1 indicates flipping in a horizontal direction, flip_dir equal to 2 indicates flipping in a vertical direction, and flip_dir equal to 3 indicates flipping in horizontal and vertical directions.

flip_dir[view_id[i]][j] specifies the flipping direction for the current part. flip_dir equal to 0 indicates no flipping, flip_dir equal to 1 indicates flipping in a horizontal direction, flip_dir equal to 2 indicates flipping in vertical direction, and flip_dir equal to 3 indicates flipping in horizontal and vertical directions.

loc_left_offset[view_id[i]][j], loc_top_offset[view_id[i]][j] specifies the location in pixels offsets, where the current part j is located in the final reconstructed picture of the view with view_id equals to view_id[i]

upsample_view_flag[view_id[i]] indicates whether the picture belonging to the view specified by view_id[i] needs to be upsampled. upsample_view_flag[view_id[i]] equal to 0 specifies that the picture with view_id equal to view_id[i] will not be upsampled. upsample_view_flag[view_id[i]] equal to 1 specifies that the picture with view_id equal to view_id[i] will be upsampled.

upsample_filter[view_id[i]] indicates the type of filter that is to be used for upsampling. upsample_filter[view_id[i]] equals to 0 indicates that the 6-tap AVC filter should be used, upsample_filter[view_id[i]] equals to 1 indicates that the 4-tap SVC filter should be used, upsample_filter[view_id[i]] 2 indicates that the bilinear filter should be used, upsample_filter[view_id[i]] equals to 3 indicates that custom filter coefficients are transmitted. When upsample_fiter[view_id[i]] is not present it is set to 0. In this embodiment, we use 2D customized filter. It can be easily extended to 1D filter, and some other nonlinear filter.

vert_dim[view_id[i]] specifies the vertical dimension of the custom 2D filter.

hor_dim[view_id[i]] specifies the horizontal dimension of the custom 2D filter.

quantizer[view_id[i]] specifies the quantization factor for each filter coefficient.

filter_coeffs[view_id[i]] [yuv][y][x] specifies the quantized filter coefficients. yuv signals the component for which the filter coefficients apply. yuv equal to 0 specifies the Y component, yuv equal to 1 specifies the U component, and yuv equal to 2 specifies the V component.

pixel_dist_x[sub_view_id[i]] and pixel_dist_y[sub_view_id[i]] respectively specify the distance in the horizontal direction and the vertical direction in the final reconstructed pseudo view between neighboring pixels in the view with sub_view_id equal to sub_view_id[i].

num_pixel_tiling_filter_coeffs_minus1[sub_view_id[i]][j] plus one indicates the number of the filter coefficients when the tiling mode is set equal to 1.

pixel_tiling_filter_coeffs[sub_view_id[i]][j] signals the filter coefficients that are required to represent a filter that may be used to filter the tiled picture.

Tiling Examples at Pixel Level

Turning to FIG. 22, two examples showing the composing of a pseudo view by tiling pixels from four views are respectively indicated by the reference numerals 2210 and 2220, respectively. The four views are collectively indicated by the reference numeral 2250. The syntax values for the first example in FIG. 22 are provided in TABLE 3 below.

TABLE 3

| pseudo_view_info (pseudo_view_id) { | Value |
|---|---|
| num_sub_views_minus_1[pseudo_view_id] | 3 |
| sub_view_id[0] | 0 |
| num_parts_minus1[0] | 0 |
| loc_left_offset[0][0] | 0 |
| loc_top_offset[0][0] | 0 |
| pixel_dist_x[0][0] | 0 |
| pixel_dist_y[0][0] | 0 |
| sub_view_id[1] | 0 |
| num_parts_minus1[1] | 0 |
| loc_left_offset[1][0] | 1 |
| loc_top_offset[1][0] | 0 |
| pixel_dist_x[1][0] | 0 |
| pixel_dist_y[1][0] | 0 |
| sub_view_id[2] | 0 |
| num_parts_minus1[2] | 0 |
| loc_left_offset[2][0] | 0 |
| loc_top_offset[2][0] | 1 |
| pixel_dist_x[2][0] | 0 |
| pixel_dist_y[2][0] | 0 |
| sub_view_id[3] | 0 |
| num_parts_minus1[3] | 0 |
| loc_left_offset[3][0] | 1 |
| loc_top_offset[3][0] | 1 |
| pixel_dist_x[3][0] | 0 |
| pixel_dist_y[3][0] | 0 |

The syntax values for the second example in FIG. 22 are all the same except the following two syntax elements: loc_left_offset[3][0] equal to 5 and loc_top_offset[3][0] equal to 3.

The offset indicates that the pixels corresponding to a view should begin at a certain offset location. This is shown in FIG. 22 (2220). This may be done, for example, when two views produce images in which common objects appear shifted from one view to the other. For example, if first and second cameras (representing first and second views) take pictures of an object, the object may appear to be shifted five pixels to the right in the second view as compared to the first view. This means that pixel(i−5, j) in the first view corresponds to pixel(i, j) in the second view. If the pixels of the two views are simply tiled pixel-by-pixel, then there may not be much correlation between neighboring pixels in the tile, and spatial coding gains may be small. Conversely, by shifting the tiling so that pixel(i−5, j) from view one is placed next to pixel(i, j) from view two, spatial correlation may be increased and spatial coding gain may also be increased. This follows because, for example, the corresponding pixels for the object in the first and second views are being tiled next to each other.

Thus, the presence of loc_left_offset and loc_top_offset may benefit the coding efficiency. The offset information may be obtained by external means. For example, the position information of the cameras or the global disparity vectors between the views may be used to determine such offset information.

As a result of offsetting, some pixels in the pseudo view are not assigned pixel values from any view. Continuing the example above, when tiling pixel(i−5, j) from view one alongside pixel(i, j) from view two, for values of i=0 . . . 4 there is no pixel(i−5, j) from view one to tile, so those pixels are empty in the tile. For those pixels in the pseudo-view (tile) that are not assigned pixel values from any view, at least one implementation uses an interpolation procedure similar to the sub-pixel interpolation procedure in motion compensation in AVC. That is, the empty tile pixels may be interpolated from neighboring pixels. Such interpolation may result in greater spatial correlation in the tile and greater coding gain for the tile.

In video coding, we can choose a different coding type for each picture, such as I, P, and B pictures. For multi-view video coding, in addition, we define anchor and non-anchor pictures. In an embodiment, we propose that the decision of grouping can be made based on picture type. This information of grouping is signaled in high level syntax.

Turning to FIG. 11, an example of 5 views tiled on a single frame is indicated generally by the reference numeral 1100. In particular, the ballroom sequence is shown with 5 views tiled on a single frame. Additionally, it can be seen that the fifth view is split into two parts so that it can be arranged on a rectangular frame. Here, each view is of QVGA size so the total frame dimension is 640×600. Since 600 is not a multiple of 16 it should be extended to 608.

For this example, the possible SEI message could be as shown in TABLE 4.

TABLE 4

| multiview_display_info( payloadSize ) { | Value |
|---|---|
| num_coded_views_minus1 | 5 |
| org_pic_width_in_mbs_minus1 | 40 |
| org_pic_height_in_mbs_minus1 | 30 |
| view_id[ 0 ] | 0 |
| num_parts[view_id[ 0 ]] | 1 |
| depth_flag[view_id[ 0 ]][ 0 ] | 0 |
| flip_dir[view_id[ 0 ]][ 0 ] | 0 |
| loc_left_offset[view_id[ 0 ]] [ 0 ] | 0 |
| loc_top_offset[view_id[ 0 ]] [ 0 ] | 0 |

TABLE 4-continued

| multiview_display_info( payloadSize ) { | Value |
|---|---|
|     frame_crop_left_offset[view_id[ 0 ]] [ 0 ] | 0 |
|     frame_crop_right_offset[view_id[ 0 ]] [ 0 ] | 320 |
|     frame_crop_top_offset[view_id[ 0 ]] [ 0 ] | 0 |
|     frame_crop_bottom_offset[view_id[ 0 ]] [ 0 ] | 240 |
|   upsample_view_flag[view_id[ 0 ]] | 1 |
|   if(upsample_view_flag[view_id[ 0 ]]) { | |
|     vert_dim[view_id[0]] | 6 |
|     hor_dim[view_id[0]] | 6 |
|     quantizer[view_id[0]] | 32 |
|     for (yuv= 0; yuv< 3; yuv++) { | |
|       for (y = 0; y < vert_dim[view_id[i]] − 1; y ++) { | |
|         for (x = 0; x < hor_dim[view_id[i]] − 1; x ++) | |
|           filter_coeffs[view_id[i]] [yuv][y][x] | XX |
| view_id[ 1 ] | 1 |
| num_parts[view_id[ 1 ]] | 1 |
|   depth_flag[view_id[ 0 ]][ 0 ] | 0 |
|   flip_dir[view_id[ 1 ]][ 0 ] | 0 |
|   loc_left_offset[view_id[ 1 ]][ 0 ] | 0 |
|   loc_top_offset[view_id[ 1 ]][ 0 ] | 0 |
|   frame_crop_left_offset[view_id[ 1 ]] [ 0 ] | 320 |
|   frame_crop_right_offset[view_id[ 1 ]] [ 0 ] | 640 |
|   frame_crop_top_offset[view_id[ 1 ]] [ 0 ] | 0 |
|   frame_crop_bottom_offset[view_id[ 1 ]] [ 0 ] | 320 |
| upsample_view_flag[view_id[ 1 ]] | 1 |
| if(upsample_view_flag[view_id[ 1 ]]) { | |
|   vert_dim[view_id[1]] | 6 |
|   hor_dim[view_id[1]] | 6 |
|   quantizer[view_id[1]] | 32 |
|   for (yuv= 0; yuv< 3; yuv++) { | |
|     for (y = 0; y < vert_dim[view_id[i]] − 1; y ++) { | |
|       for (x = 0; x < hor_dim[view_id[i]] − 1; x ++) | |
|         filter_coeffs[view_id[i]] [yuv][y][x] | XX |
| ......(similarly for view 2,3) | |
| view_id[ 4 ] | 4 |
| num_parts[view_id[ 4 ]] | 2 |
|   depth_flag[view_id[ 0 ]][ 0 ] | 0 |
|   flip_dir[view_id[ 4 ]][ 0 ] | 0 |
|   loc_left_offset[view_id[ 4 ]] [ 0 ] | 0 |
|   loc_top_offset[view_id[ 4 ]] [ 0 ] | 0 |
|   frame_crop_left_offset[view_id[ 4 ]] [ 0 ] | 0 |
|   frame_crop_right_offset[view_id[ 4 ]] [ 0 ] | 320 |
|   frame_crop_top_offset[view_id[ 4 ]] [ 0 ] | 480 |
|   frame_crop_bottom_offset[view_id[ 4 ]] [ 0 ] | 600 |
|   flip_dir[view_id[ 4 ]][ 1 ] | 0 |
|   loc_left_offset[view_id[ 4 ]] [ 1 ] | 0 |
|   loc_top_offset[view_id[ 4 ]] [ 1 ] | 120 |
|   frame_crop_left_offset[view_id[ 4 ]] [ 1 ] | 320 |
|   frame_crop_right_offset[view_id[ 4 ]] [ 1 ] | 640 |
|   frame_crop_top_offset[view_id[ 4 ]] [ 1 ] | 480 |
|   frame_crop_bottom_offset[view_id[ 4 ]] [ 1 ] | 600 |
| upsample_view_flag[view_id[ 4 ]] | 1 |
| if(upsample_view_flag[view_id[ 4 ]]) { | |
|   vert_dim[view_id[4]] | 6 |
|   hor_dim[view_id[4]] | 6 |
|   quantizer[view_id[4]] | 32 |
|   for (yuv= 0; yuv< 3; yuv++) { | |
|     for (y = 0; y < vert_dim[view_id[i]] − 1; y ++) { | |
|       for (x = 0; x < hor_dim[view_id[i]] − 1; x ++) | |
|         filter_coeffs[view_id[i]] [yuv][y][x] | XX |

TABLE 5 shows the general syntax structure for transmitting multi-view information for the example shown in TABLE 4.

TABLE 5

| multiview_display_info( payloadSize ) { | C | Descriptor |
|---|---|---|
|   num_coded_views_minus1 | 5 | ue(v) |
|   org_pic_width_in_mbs_minus1 | 5 | ue(v) |
|   org_pic_height_in_mbs_minus1 | 5 | ue(v) |
|   for( i = 0; i <= num_coded_views_minus1; i++ ) { | | |
|     view_id[ i ] | 5 | ue(v) |
|     num_parts[view_id[ i ]] | 5 | ue(v) |

TABLE 5-continued

| multiview_display_info( payloadSize ) { | C | Descriptor |
|---|---|---|
|     for( j = 0; j <= num_parts[i]; j++ ) { | | |
|       depth_flag[view_id[ i ]][ j ] | | |
|       flip_dir[view_id[ i ]][ j ] | 5 | u(2) |
|       loc_left_offset[view_id[ i ]] [ j ] | 5 | ue(v) |
|       loc_top_offset[view_id[ i ]] [ j ] | 5 | ue(v) |
|       frame_crop_left_offset[view_id[ i ]] [ j ] | 5 | ue(v) |
|       frame_crop_right_offset[view_id[ i ]] [ j ] | 5 | ue(v) |
|       frame_crop_top_offset[view_id[ i ]] [ j ] | 5 | ue(v) |
|       frame_crop_bottom_offset[view_id[ i ]] [ j ] | 5 | ue(v) |
|     } | | |
|     upsample_view_flag[view_id[ i ]] | 5 | u(1) |
|     if(upsample_view_flag[view_id[ i ]]) | | |
|       upsample_filter[view_id[ i ]] | 5 | u(2) |
|     if(upsample_fiter[view_id[i]] == 3) { | | |
|       vert_dim[view_id[i]] | 5 | ue(v) |
|       hor_dim[view_id[i]] | 5 | ue(v) |
|       quantizer[view_id[i]] | 5 | ue(v) |
|       for (yuv= 0; yuv< 3; yuv++) { | | |
|         for (y = 0; y < vert_dim[view_id[i]] − 1; | | |
|         y ++) { | | |
|           for (x = 0; x < hor_dim[view_id[i]] − 1; | | |
|           x ++) | | |
|             filter_coeffs[view_id[i]] [yuv][y][x] | 5 | se(v) |
|         } | | |
|       } | | |
|     } | | |
|   } | | |
| } | | |

Figure 23:
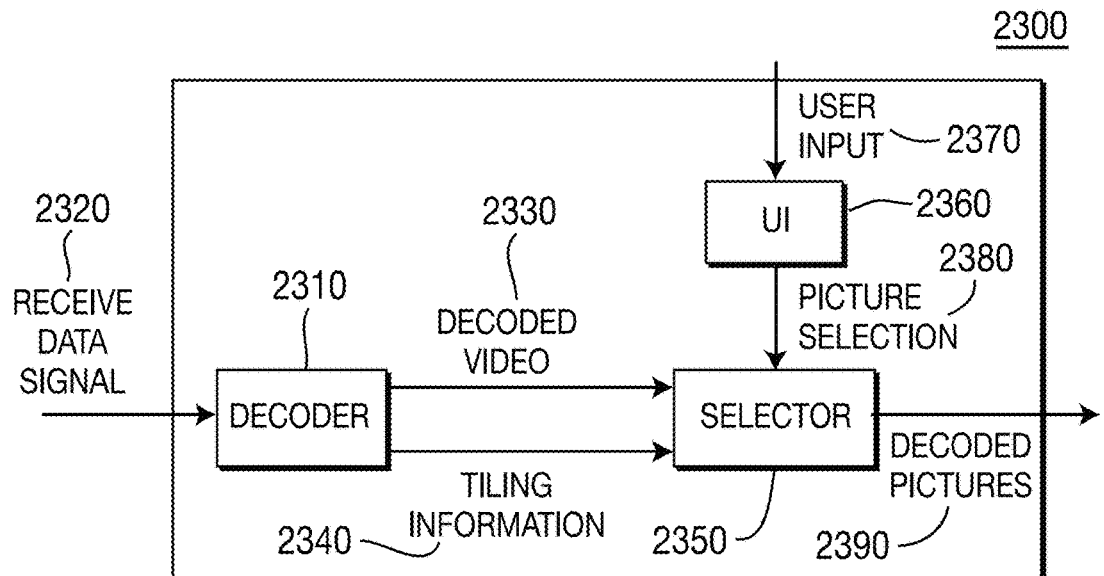
FIG. 23 shows a block diagram for a video processing device to which the present principles may be applied, in accordance with an embodiment of the present principles.

Referring to FIG. 23, a video processing device 2300 is shown. The video processing device 2300 may be, for example, a set top box or other device that receives encoded video and provides, for example, decoded video for display to a user or for storage. Thus, the device 2300 may provide its output to a television, computer monitor, or a computer or other processing device.

The device 2300 includes a decoder 2310 that receive a data signal 2320. The data signal 2320 may include, for example, an AVC or an MVC compatible stream. The decoder 2310 decodes all or part of the received signal 2320 and provides as output a decoded video signal 2330 and tiling information 2340. The decoded video 2330 and the tiling information 2340 are provided to a selector 2350. The device 2300 also includes a user interface 2360 that receives a user input 2370. The user interface 2360 provides a picture selection signal 2380, based on the user input 2370, to the selector 2350. The picture selection signal 2380 and the user input 2370 indicate which of multiple pictures a user desires to have displayed. The selector 2350 provides the selected picture(s) as an output 2390. The selector 2350 uses the picture selection information 2380 to select which of the pictures in the decoded video 2330 to provide as the output 2390. The selector 2350 uses the tiling information 2340 to locate the selected picture(s) in the decoded video 2330.

In various implementations, the selector 2350 includes the user interface 2360, and in other implementations no user interface 2360 is needed because the selector 2350 receives the user input 2370 directly without a separate interface function being performed. The selector 2350 may be implemented in software or as an integrated circuit, for example. The selector 2350 may also incorporate the decoder 2310.

More generally, the decoders of various implementations described in this application may provide a decoded output that includes an entire tile. Additionally or alternatively, the decoders may provide a decoded output that includes only one or more selected pictures (images or depth signals, for example) from the tile.

As noted above, high level syntax may be used to perform signaling in accordance with one or more embodiments of the present principles. The high level syntax may be used, for example, but is not limited to, signaling any of the following: the number of coded views present in the larger frame; the original width and height of all the views; for each coded view, the view identifier corresponding to the view; for each coded view, the number of parts the frame of a view is split into; for each part of the view, the flipping direction (which can be, for example, no flipping, horizontal flipping only, vertical flipping only or horizontal and vertical flipping); for each part of the view, the left position in pixels or number of macroblocks where the current part belongs in the final frame for the view; for each part of the view, the top position of the part in pixels or number of macroblocks where the current part belongs in the final frame for the view; for each part of the view, the left position, in the current large decoded/encoded frame, of the cropping window in pixels or number of macroblocks; for each part of the view, the right position, in the current large decoded/encoded frame, of the cropping window in pixels or number of macroblocks; for each part of the view, the top position, in the current large decoded/encoded frame, of the cropping window in pixels or number of macroblocks; and, for each part of the view, the bottom position, in the current large decoded/encoded frame, of the cropping window in pixels or number of macroblocks; for each coded view whether the view needs to be upsampled before output (where if the upsampling needs to be performed, a high level syntax may be used to indicate the method for upsampling (including, but not limited to, AVC 6-tap filter, SVC 4-tap filter, bilinear filter or a custom 1 D, 2D linear or non-linear filter).

It is to be noted that the terms "encoder" and "decoder" connote general structures and are not limited to any particular functions or features. For example, a decoder may receive a modulated carrier that carries an encoded bitstream, and demodulate the encoded bitstream, as well as decode the bitstream.

Various methods have been described. Many of these methods are detailed to provide ample disclosure. It is noted, however, that variations are contemplated that may vary one or many of the specific features described for these methods. Further, many of the features that are recited are known in the art and are, accordingly, not described in great detail.

Further, reference has been made to the use of high level syntax for sending certain information in several implementations. It is to be understood, however, that other implementations use lower level syntax, or indeed other mechanisms altogether (such as, for example, sending information as part of encoded data) to provide the same information (or variations of that information).

Various implementations provide tiling and appropriate signaling to allow multiple views (pictures, more generally) to be tiled into a single picture, encoded as a single picture, and sent as a single picture. The signaling information may allow a post-processor to pull the views/pictures apart. Also, the multiple pictures that are tiled could be views, but at least one of the pictures could be depth information. These implementations may provide one or more advantages. For example, users may want to display multiple views in a tiled manner, and these various implementations provide an efficient way to encode and transmit or store such views by tiling them prior to encoding and transmitting/storing them in a tiled manner.

Implementations that tile multiple views in the context of AVC and/or MVC also provide additional advantages. AVC is ostensibly only used for a single view, so no additional view is expected. However, such AVC-based implementations can provide multiple views in an AVC environment because the tiled views can be arranged so that, for example, a decoder knows that that the tiled pictures belong to different views (for example, top left picture in the pseudo-view is view 1, top right picture is view 2, etc).

Additionally, MVC already includes multiple views, so multiple views are not expected to be included in a single pseudo-view. Further, MVC has a limit on the number of views that can be supported, and such MVC-based implementations effectively increase the number of views that can be supported by allowing (as in the AVC-based implementations) additional views to be tiled. For example, each pseudo-view may correspond to one of the supported views of MVC, and the decoder may know that each "supported view" actually includes four views in a pre-arranged tiled order. Thus, in such an implementation, the number of possible views is four times the number of "supported views".

The implementations described herein may be implemented in, for example, a method or process, an apparatus, or a software program. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processing devices also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding and decoding. Examples of equipment include video coders, video decoders, video codecs, web servers, set-top boxes, laptops, personal computers, cell phones, PDAs, and other communication devices. As should be clear, the equipment may be mobile and even installed in a mobile vehicle.

Additionally, the methods may be implemented by instructions being performed by a processor, and such instructions may be stored on a processor-readable medium such as, for example, an integrated circuit, a software carrier or other storage device such as, for example, a hard disk, a compact diskette, a random access memory ("RAM"), or a read-only memory ("ROM"). The instructions may form an application program tangibly embodied on a processor-readable medium. As should be clear, a processor may include a processor-readable medium having, for example, instructions for carrying out a process. Such application programs may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

As should be evident to one of skill in the art, implementations may also produce a signal formatted to carry information that may be, for example, stored or transmitted. The information may include, for example, instructions for performing a method, or data produced by one of the described implementations. Such a signal may be formatted, for example, as an electromagnetic wave (for example, using a radio frequency portion of spectrum) or as a baseband signal. The formatting may include, for example, encoding a data stream, producing syntax, and modulating a carrier with the encoded data stream and the syntax. The information that the signal carries may be, for example, analog or digital information. The signal may be transmitted over a variety of different wired or wireless links, as is known.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. In particular, although illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. Accordingly, these and other implementations are contemplated by this application and are within the scope of the following claims.

The invention claimed is:

1. A method for decoding coded video pictures, the method comprising:
   receiving in a processor a coded video bitstream comprising coded video pictures;
   determining from the coded video bitstream a single picture in a rectangular frame, wherein the single picture includes a first picture and a second picture tiled together;
   accessing information to determine how the first picture and the second picture are tiled together using two or more tiles, wherein the accessed information indicates that the second picture is split into two or more parts so that it can be arranged in the rectangular frame together with the first picture; and
   decoding the single picture into the first picture and the second picture.

2. The method of claim 1 wherein at least one of the first picture or a part of the second picture is individually flipped in the horizontal or the vertical direction.

3. The method of claim 1, wherein the single picture further comprises a depth image added as a tile, wherein the depth image is associated with the first picture or the second picture.

4. The method of claim 1, wherein the first picture and the second picture correspond to a left view and a right view of a stereoscopic image.

5. The method of claim 1, further comprising: accessing upsampling information related to the first picture or the second picture.

6. The method of claim 1, further comprising: accessing offset information of the position of the tiles in the single picture with respect to its origin.

7. The method of claim 6, wherein the offset information comprises one or more of a left offset, a right offset, a top offset, or a bottom offset.

8. A method for encoding video pictures into a coded bitstream, the method comprising:
   receiving video pictures;
   tiling together multiple pictures into a single video picture in a rectangular frame, the multiple pictures including a first picture and a second picture;
   generating information in a signaling section indicating how the multiple pictures are combined into tiles, wherein the generated information indicates that the second picture is split into two or more parts so that it can be arranged in the rectangular frame together with the first picture;
   encoding the single video picture to provide a coded picture; and
   combining the signaling section and the coded picture as output.

9. The method of claim 8, wherein the information in the signaling section indicates that at least one of the first picture or a part of the second picture is individually flipped in the horizontal or the vertical direction.

10. The method of claim 8, wherein the single video picture further comprises a depth image added as a tile, wherein the depth image is associated with the first picture or the second picture.

* * * * *